United States Patent
Hoyer et al.

(10) Patent No.: US 10,659,917 B2
(45) Date of Patent: *May 19, 2020

(54) TRACKING FOR BADGE CARRIER

(71) Applicant: ASSA ABLOY AB, Stockholm (SE)

(72) Inventors: Philip Hoyer, Richmond (GB); Julian Eric Lovelock, Pleasanton, CA (US); Mark Robinton, Eden Prairie, MN (US)

(73) Assignee: ASSA ABLOY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/877,030

(22) Filed: Jan. 22, 2018

(65) Prior Publication Data

US 2018/0146336 A1 May 24, 2018

Related U.S. Application Data

(63) Continuation of application No. 15/210,188, filed on Jul. 14, 2016.

(Continued)

(51) Int. Cl.
*H04W 4/02* (2018.01)
*G07C 9/00* (2020.01)
(Continued)

(52) U.S. Cl.
CPC ......... *H04W 4/023* (2013.01); *G07C 9/00111* (2013.01); *H04B 5/0075* (2013.01);
(Continued)

(58) Field of Classification Search
CPC ..... H04W 4/023; H04W 4/008; H04W 12/08; H04W 4/021; H04B 5/0075; G07C 9/00111

See application file for complete search history.

(56) References Cited

U.S. PATENT DOCUMENTS 6,539,393 B1 3/2003 Kabala
7,152,791 B2 12/2006 Chappidi et al.
(Continued)

FOREIGN PATENT DOCUMENTS

WO WO 02/088776 11/2002

OTHER PUBLICATIONS

Extended European Search Report for European Patent Application No. 16179381.5, dated Nov. 29, 2016, 9 pages.
(Continued)

*Primary Examiner* — Chuong A Ngo
(74) *Attorney, Agent, or Firm* — Schwegman Lundberg & Woessner, P.A.

(57) ABSTRACT

A tracking system is disclosed that enables the tracking of a beacon device and a credential device being held by the beacon device. The beacon device may communicate with readers of an access control system using a first communication protocol whereas the credential device being held by the beacon device may communicate with readers of the access control system using a second communication protocol. As the beacon device and the credential device being held by the beacon device may also communicate with readers at different times, a beacon device may be associated with a credential device being held thereby such that tracking of one device enables inferred tracking of the other device.

28 Claims, 10 Drawing Sheets

Related U.S. Application Data

(60) Provisional application No. 62/192,088, filed on Jul. 14, 2015.

(51) Int. Cl.
*H04W 4/80* (2018.01)
*H04B 5/00* (2006.01)
*H04W 4/021* (2018.01)
*H04W 12/08* (2009.01)

(52) U.S. Cl.
CPC .............. *H04W 4/021* (2013.01); *H04W 4/80* (2018.02); *H04W 12/08* (2013.01)

(56) References Cited

U.S. PATENT DOCUMENTS

| | | | |
|---|---|---|---|
| 7,706,778 B2 | 4/2010 | Lowe | |
| 8,074,271 B2 | 12/2011 | Davis et al. | |
| 8,171,528 B1* | 5/2012 | Brown | G06F 21/32 726/3 |
| 9,924,319 B2 | 3/2018 | Hoyer et al. | |
| 2004/0176032 A1 | 9/2004 | Kotola et al. | |
| 2007/0229252 A1* | 10/2007 | Collins | G08B 21/02 340/539.13 |
| 2008/0302867 A1 | 12/2008 | Holberg | |
| 2010/0179822 A1* | 7/2010 | Reppas | G06Q 10/08 705/2 |
| 2012/0154115 A1 | 6/2012 | Herrala | |
| 2012/0270528 A1 | 10/2012 | Goodman | |
| 2013/0030931 A1* | 1/2013 | Moshfeghi | G01S 19/48 705/16 |
| 2015/0339461 A1* | 11/2015 | Min | G06F 21/10 726/28 |
| 2016/0048878 A1* | 2/2016 | Corbalis | H04W 4/029 705/14.58 |
| 2016/0212103 A1* | 7/2016 | Rhoads | H04W 12/02 |
| 2016/0247338 A1* | 8/2016 | Maor | H04W 4/80 |
| 2016/0375579 A1* | 12/2016 | Muttik | H04W 4/021 700/250 |
| 2017/0019765 A1 | 1/2017 | Hoyer et al. | |

OTHER PUBLICATIONS

Official Action for U.S. Appl. No. 15/210,188, dated Jun. 16, 2017, 18 pages.
Notice of Allowance for U.S. Appl. No. 15/210,188, dated Oct. 25, 2017, 10 pages.
"U.S. Appl. No. 15/210,188, 312 Amendment filed Jan. 24, 2018", 8 pgs.
"U.S. Appl. No. 15/210,188, Corrected Notice of Allowability dated Feb. 6, 2018", 2 pgs.
"U.S. Appl. No. 15/210,188, Preliminary Amendment filed Oct. 11, 2016", 7 pgs.
"U.S. Appl. No. 15/210,188, PTO Response to Rule 312 Communication dated Feb. 6, 2018", 2 pgs.
"U.S. Appl. No. 15/210,188, Response filed Sep. 18, 2017 to Non Final Office Action dated Jun. 16, 2017", 11 pgs.

* cited by examiner

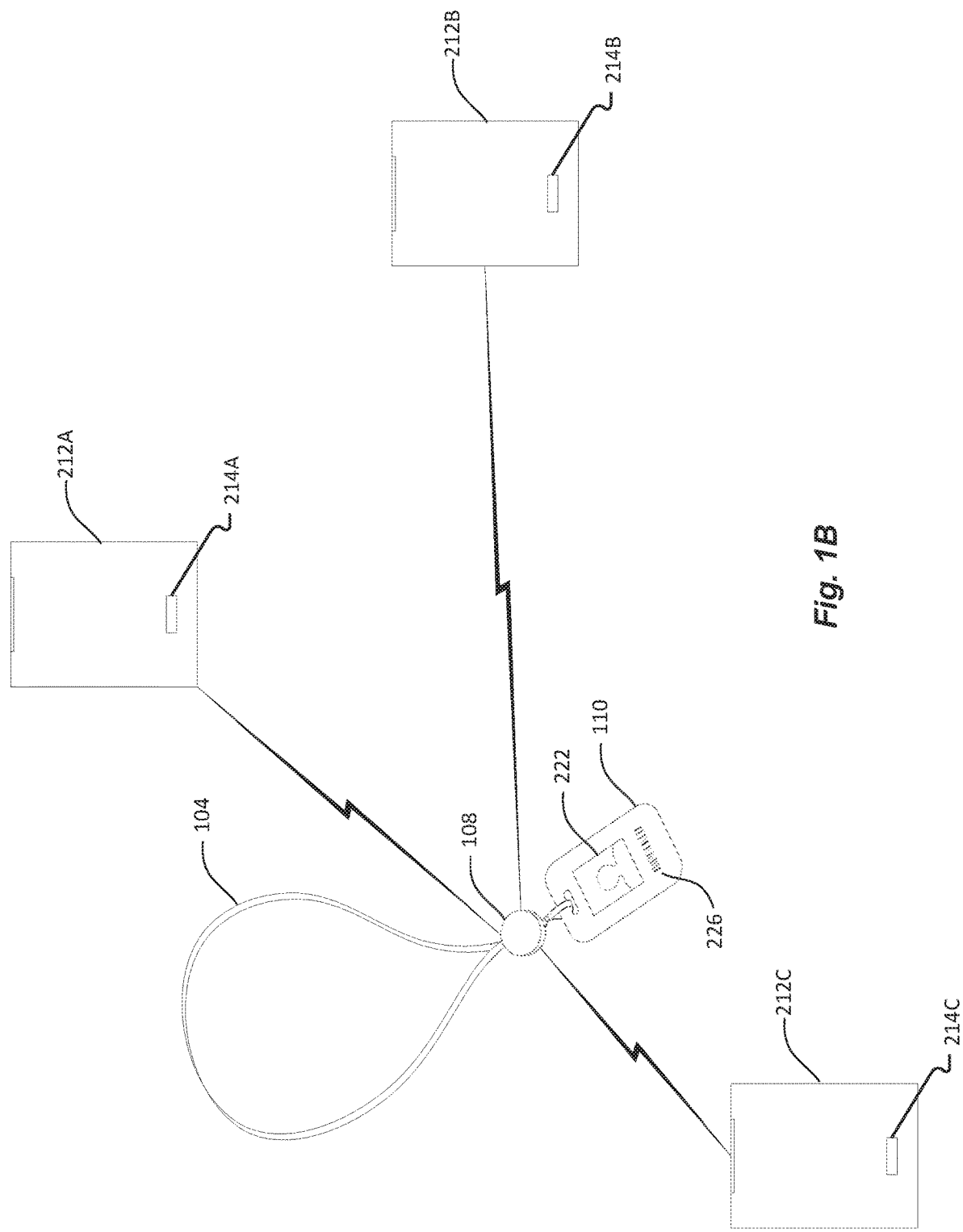

TRACKING FOR BADGE CARRIER

CROSS-REFERENCE TO RELATED APPLICATIONS

The present application is a continuation of U.S. patent application Ser. No. 15/210,188, filed on Jul. 14, 2016, now U.S. Pat. No. 9,924,319, which claims the benefits of and priority, under 35 U.S.C. § 119(e), to U.S. Provisional Application Ser. No. 62/192,088, filed on Jul. 14, 2015, entitled "Tracking for Badge Carrier," the entire disclosures of which are hereby incorporated by reference, in their entirety, for all that they teach and for all purposes.

FIELD

The present disclosure is generally directed to asset location tracking, and more specifically to asset location tracking using existing access control systems.

BACKGROUND

The ability to track assets—including human assets, such as employees or visitors—in real time throughout a building or in multi-room premises can be beneficial, particularly in certain fields. One such application is in the medical field, where the ability to track both nurses and patients in a hospital, in real-time, is desirable. The solution for this is often referred to as Real-Time Location Services (RTLS).

There are two types of technologies used to support RTLS: (1) passive RFID (e.g. UHF), which utilizes cheap tags, coarse tracking and expensive readers; and (2) active tags, which utilize RFID technologies or a combination of technologies such as WiFi and Infrared (IR) that are generally much more expensive, but also yield much more precise location determinations.

Employees or visitors to a secure facility such as a hospital are often given an access badge or other device containing access credentials, which allows them to enter or exit one or more areas of the secure facility. In facilities that utilize tracking or location services, people that need to be tracked are often given an additional tracking device beyond the traditional access badge.

SUMMARY

Problematically, many people do not like to carry two separate devices (e.g. an access badge and a tracking device), as it is not only cumbersome but more likely that one or both devices will become lost or separated. Moreover, it is often expensive to install the tracking readers needed to determine the location of tracking devices.

Existing physical access control systems and locks for the same already provide a powered infrastructure at regular intervals in a building that can be used to track people. Readers in these access control systems are increasingly being fitted with Bluetooth (e.g., Bluetooth Low Energy (BLE)) capability.

It is with respect to the above issues and other problems that the embodiments presented herein were contemplated.

According to some embodiments of the present disclosure, a first tracking device based on BLE and/or other communication protocols is provided within or in the form of a physical lanyard, retractable badge reel or card holder sleeve or other device that can removably secure or be attached to a second tracking device, such as a card or badge (referred to herein as a credential device). In some embodiments, the first tracking device would comprise a beacon device or similar device that broadcasts information. Such information could include dynamic location information and, optionally, one or both of identify information associated with the holder or user and/or identity information associated with the tracking or beacon device, such as a device identification number. The device identification number may be static or dynamic. A dynamic identification number is one that changes over time, although even a static identification number is subject to periodic change. Advantageously, these embodiments avoid the need to integrate the first tracking device and the second tracking device into a single device, thereby saving implementation costs.

More specifically, embodiments of the present disclosure would allow the first tracking device (e.g. a beacon device in the form of the physical lanyard, the retractable badge reel, or the card holder) to hold a credential device (the second tracking device)—and, indeed, to provide a means of securing the credential device to the user thereof—and still serve as a tracking device. In some embodiments, a basket in which lanyards (or retractable badge reels or card holder devices) are stored when not in use by visitors or other persons could automatically, wirelessly recharge multiple tracking devices simultaneously. In embodiments where the tracking device is a retractable badge reel, it is even feasible to recharge the battery using the extraction motion when the badge is extended and/or retracted from the reel.

As used herein, an access control system is a system that makes access control decisions. In one embodiment, the access control system comprises a plurality of readers configured to control access to a protected resource at given access points, such as doors or gates, and further comprises one or more credential devices storing access credentials and configured to communicate with the readers. A central host or control panel may also comprise part of the access control system. A mobile device may be a smartphone, a tablet, or any other device comprising a processor, a data storage capability (e.g., computer memory), and a wireless communication capability. The mobile device may further include a downloadable application that provides and controls functionality of the device. For example, the mobile device application can control the change of its identification number or that of a beacon device or credential device. A user is an individual in possession of a credential device. A reader, which may also be referred to as a reading device or interrogator, is a device having a location (which may or may not be fixed) near an access point to a protected resource, and that is configured to grant access to the protected resource—for example, upon receipt of authorized credentials from a credential device. A reader may comprise a contact-based or contactless communication interface (also referred to herein as a wireless communication interface, which may include one or both of a wireless communication receiver and a wireless communication transmitter, or a wireless communication transceiver), a memory for storing at least instructions, and a processor for carrying out instructions stored in memory. In some embodiments, the instructions may be stored as firmware. The access control decision may be made in a reader, in a tracking device, in a credential, or at a central host, control panel or other remote system in communication with the reader(s), tracking device (s) and credential(s) or in a combination of any or all of these system components. The communication among the system components may be direct or indirect. For example, the tracking device and/or mobile device may provide a communication channel between a reader and a remote system.

In such a case, the reader would not make the decision and would pass information to the remote system for making the access decision.

As used herein, "credentials" or "credential information" refer to any data, set of data, encryption scheme, key, and/or transmission protocol stored in or on or used by a credential device to authenticate and/or to verify its authenticity with a reader, mobile device, and/or interrogator. As used herein, "credential device" refers to the physical system component that holds and provides a credential. For example, if the identify of one of the beacon device and the credential device is previously known to the access control system and the other of the beacon device and credential device is unknown or anonymous as tracked by the access control system, the step of associating the beacon device with the credential device will also enable identification of the unknown device with the known device unassociated device. Similarly, if both devices are unknown or anonymous to the access control system, embodiments of the present disclosure will allow association of the two anonymous devices. Credential devices include, but are not limited to, devices that transfer information to a reader, such as an RFID tag, a printed card or badge, a fob, a disk, a smart card, a mobile device, beacon, a device with a magnetic stripe or bar code, etc. A credential device may also comprise photograph and name printed on a badge or paper that is visually inspected by a human. A credential device may comprise a contact-based or contactless communication interface. If wireless, the communication device may broadcast physical location information continuously or periodically.

By way of example, visitors to a secure facility or location may be issued a credential device for authentication while visiting the facility. A credential device may include its own power source, or use power provided from another source, or be completely unpowered. A credential device may comprise, for example, RFID components, (e.g., a capacitor, antenna, etc.). In this example, when the credential device is presented within an RFID field provided by another device (e.g. a reader), the other device provides energy via the RFID field that can be stored in the capacitor of the credential device. As another example, a credential device may be a paper card with information encoded thereon (e.g. an image, text, and/or a 1-dimensional or 2-dimensional barcode). Powered credential devices may include, for example, a smartcard with an active RFID tag (e.g. a tag powered by a power source internal to the smartcard), or a mobile device. In some embodiments, the credential device may be disposable.

Credential devices issued to visitors (or other individuals) may be required to be attached to the visitor or other individual in a location visible by others. Alternatively, a visitor or other individual with a credential device may desire to attach the credential device to his or her person in a way that allows the credential device to be readily available for presentation to a reader. The credential device may be configured to be attached to the visitor or other individual, for example, using a lanyard, a badge holder, a badge reel, or another accessory that facilitates the visitor's carrying of the credential device in a readily accessible and/or readily visible manner. The accessory may be attachable to the clothing or body of the user, and the credential device may be attachable to the accessory, via clasping, pinning, connecting, adhering, hanging, or any other suitable form of attachment. The accessory also comprises a first tracking device, such as a beacon device. As a result, there are two tracking devices associated with the individual.

While visitors to a secure facility or location may be issued a credential device for the length of their visit, employees or others who require repeated access to the secure facility or location may also be issued a credential device. Credential devices intended for long-term use may, in some embodiments, be of a more substantial construction than credential devices intended for visitor use. For example, smart cards and mobile devices may be used as credential devices by long-term users of a secure facility or location. In some embodiments, credential devices issued to visitors and to long-term users may be substantially identical, and other aspects of the access control system with which the credential devices are used may be utilized to distinguish between visitors and regular users of the protected resource. In some embodiments, credential devices owned or possessed by visitors or employees may be used, provided they are able to communicate with the access control system.

According to some aspects of the present disclosure, the association of a credential device and a specific user is known. When a beacon device is provided to the same user, for either a short or long term use, the beacon device also may be associated with or registered with the use such that the access control system knows the two devices are associated with a single user. As a result, either device will identify the location of the user. Alternatively, the beacon device may not be associated or registered with the user at the time it is provided. In this situation, the beacon device is broadcasting information anonymously in the sense that the location of the beacon device is known, but there is no user associated with the device. But when the credential device, which is associated with the user, first communicates with a reader and the access control system identifies the location of the user based upon the credential device, the access control system will then also be able to associate the beacon device with the credential device and the user, based upon the location of the beacon device and credential device being the same or nearly the same. The same associate process can successfully occur if the system knows the beacon device is associated with a specific user, but the system does not know the identity of the user's credential device. Once the system identifies the two devices are in the same location and one of the devices is associated with a user, the system may associate the second device with the same user. Because of the precision location abilities of current technology, accurate user associate may occur even if multiple beacon devices and multiple credential devices are near each other. If the identification number associated with the devices changes over time, the process of re-association of multiple devices with a user must also periodically occur.

According to aspects of the present disclosure, the access control system may also increase or decrease a user's access authorization dynamically based upon the associated credential and location information. For example, if a beacon device is physically separated from a credential device, authorizations for both devices may be decreased or terminated. Similarly, if a credential device and beacon device are detected at a location where the associated user is not authorized, permissions may be down-graded or terminated, or the authentication step may require additional levels of identification and/or authorization be provided by the user. If the requested additional information is not provided or is not available to the user, access may be denied. Alternatively, the access control system could elevate or increase the authorization associated with a user. Such increased or decreased authorizations may occur the next occasion each device communicates with a reader. Optionally, if the user's credential device is a legacy or technically unsophisticated device, such as utilizing a magnetic stripe bar code or photograph, the access control system could require higher level identification (such as a PIV card) from the user prior to upgrading authorizations.

Any number of communication protocols may be employed by beacon devices and credential devices employed herein, which may use the same or different communication protocols. Examples of communications protocols can include, but are in no way limited to, the protocol or protocols associated with near field communication (NFC), radio frequency identification (RFID) (e.g., operating at 125 kHz, 13.56 kHz, etc.), Bluetooth wireless communication, Bluetooth Low Energy (BLE), Personal Area Network (PAN), Body Area Network (BAN), cellular communications, WiFi communications, and/or other wireless communications. The most basic credential devices may not have any transmission capability, but may rather be designed to be scanned or otherwise read (e.g. by a barcode scanner or another laser scanner or an optical scanner). According to aspects of the present disclosure, if the beacon device and the credential device utilize the same communication protocol, it is also an available option to have the beacon and credential devices communicate with each other, and have one of the devices responsible for primary communication with the access control system. Thus, it would be feasible that the Beacon device could query or check the signal emanating from the credential device and transmit such information to the reader without the credential device having to transmit anything to the reader directly. However, both devices may still communicate as needed with the access control system.

The terms "memory," "computer memory," and "computer-readable medium," as used herein, refer to any tangible data storage medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read instructions. When the computer-readable medium is configured as part of a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The processors described herein may be, by way of example and not limitation, one or more of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a", "an", "one or more" and "at least one" can be used interchangeably herein. It is also to be noted that the terms "comprising", "including", and "having" can be used interchangeably.

The terms "determine," "calculate," and "compute," and variations thereof, as used herein, are used interchangeably and include any type of methodology, process, mathematical operation, or technique.

The term "means" as used herein shall be given its broadest possible interpretation in accordance with 35 U.S.C., Section 112, Paragraph (f). Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The term "module" as used herein refers to any known or later developed software or firmware that, when executed by a processor, is capable of performing the functionality associated with that element.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed description of the various aspects, embodiments, and configurations of the disclosure, as illustrated by the drawings referenced below.

FIG. 1B is a diagram depicting aspects of an access control system according to at least one embodiment of the present disclosure;

DETAILED DESCRIPTION

Figure 1A:
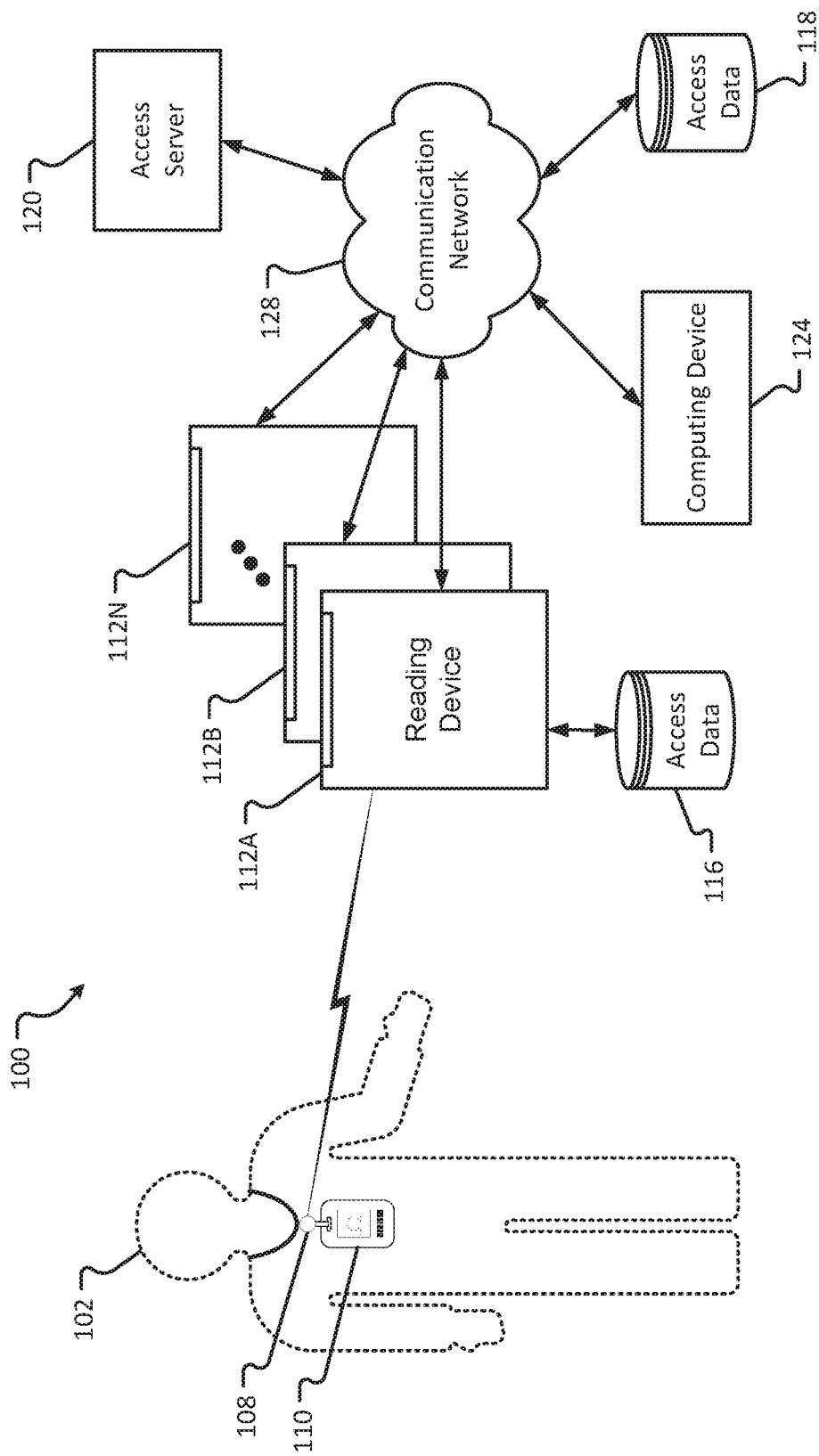
FIG. 1A is a diagram depicting an access control system in accordance with embodiments of the present disclosure.

An access control system according to one embodiment of the present disclosure comprises a tracking device, such as a credential device, configured for removable attachment to another tracking device, such as a beacon device, the credential device comprising an antenna that enables wireless communications with one or more readers using a second communication protocol that is different from a first communication protocol used by the beacon device to communicate with the one or more readers; and an access server configured to receive communications from the one or more readers, associate the credential device and the beacon device in a memory, and determine, based on the received communications, a location of the beacon device and the credential device.

The access server may comprise a communication interface that enables the access server to receive the communications from the one or more readers. The first communication protocol may comprise at least one of Bluetooth, Bluetooth Low Energy (BLE), and WiFi. The second communication protocol may utilize an inductive coupling between the antenna and a reader antenna of the one or more readers. The one or more readers may receive a communication from the beacon device at a first time and the credential device may communicate with the one or more readers at a second time different from the first time. The first time may precede the second time.

The communication range of the first communication protocol may be greater than a communication range of the second communication protocol, or vice versa. Alternatively, the communication range of the first and second communication protocols may be the same. One of the first and second communications protocols may be capable of communicating at a greater strength, or over a greater distance, than the other. Additionally, the beacon device may be chargeable by motion of a retractable member. The one or more readers may receive a beacon identifier from the beacon device via the first communication protocol. In some embodiments, two or more readers may receive a communication from the beacon device, and a position of the beacon device may be determined, at least in part, based on triangulation between a first and second of the two or more readers that receive the communication from the beacon device. The credential device may be configured to communicate wirelessly, or it may require physical presentation to a reader for contact or optical assessment in order to determine its identification. At least in the latter situation, the location of the reader may be used as the location of the credential device. The access server may comprise an asset tracking module to determine a location of the beacon device and the credential device. The access server may be further configured to change an access authorization of the credential device based upon the location of the beacon device and the credential device. The access server may also comprise a validation engine configured to verify that information received by the one or more readers and included in the communications from the one or more readers originated from the beacon device, based on pseudo-random sequences of data included in the information.

According to another embodiment of the present disclosure, a method of tracking assets in an access control system, comprises receiving, from a first reader in the access control system, a first communication comprising information about a first signal transmitted by a beacon device using a first communication protocol; receiving, from the first reader, a second communication comprising information about a second signal transmitted by a credential device to the first reader using a second communication protocol; associating, based on the first and second communications, the beacon device and the credential device; and determining, with a processor, a location of the beacon device based on at least one of the information about the first signal and the information about the second signal. The first communication protocol may be Bluetooth, BLE, or WiFi. The second communication protocol may utilize inductive coupling. For example, if the identify of one of the beacon device and the credential device is previously known to the access control system and the other of the beacon device and credential device is unknown or anonymous as tracked by the access control system, the step of associating the beacon device with the credential device will also enable identification of the unknown device with the known device. Similarly, if both devices are unknown or anonymous to the access control system, embodiments of the present disclosure will allow association of the two anonymous devices. Alternatively, instead of receiving the second communication from the credential device at the first reader, the second communication from the credential device may be received at a second reader located generally proximate the first reader. For example, the first reader may be configured to communicate with the beacon device over a first distance, and the second reader may be configured to communicate with the credential device over a second distance, where the first and second distances are different due to the nature of the readers. The second reader may utilize a communication protocol that operates wirelessly at 125 KHz and the first reader may utilize a Bluetooth or WiFi communication protocol. The locations of the first and second readers being known, the step of associating the beacon device and the credential device may reliably occur.

The method may further comprise receiving, from a second reader, a third communication comprising additional information about the first signal transmitted by the beacon device, and the location determining may comprise triangulating a position of the beacon device based on the information about the first signal in the first communication and the additional information about the first signal in the third communication. The information about the first signal in the first communication and the additional information about the first signal in the third communication may each comprise signal strength information, and wherein the location determining may further comprise utilizing the signal strength information to determine a first distance between the beacon device and the first reader and a second distance between the beacon device and the second reader. The method may also further comprise determining, with the processor, a location of the credential device based on the information about the second signal.

According to another embodiment of the present disclosure, an access server comprises a processor, a communication interface, and a memory. The memory stores information associating an individual and a credential device and associating the credential device and a beacon device. The memory further stores instructions for execution by the processor that, when executed by the processor, cause the processor to determine a position of the beacon device based on first information received via the communication interface from a first reader and second information received via the communication interface from a second reader, the first and second information comprising signal strength information about a signal received by the first reader and the second reader from the beacon device. Determining a position of the beacon device may utilize at least one of Received Signal Strength Indication (RSSI), Time of Flight (ToF), Angle of Arrival (AoA), phase detection, and echo detection.

Also, the memory may store additional instructions for execution by the processor that, when executed by the processor, further cause the processor to determine a position of the credential device based on third information received via the communication interface from the first reader, the second reader, or a third reader, the third information evidencing a communication between the credential device and the first reader, the second reader, or the third reader.

Before any embodiments of the disclosure are explained in greater detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The systems and methods described herein may provide many potential advantages over prior systems. For instance, the systems and methods described herein may be compatible with existing inductive/RF/125 kHz access control systems and even with paper printed visitor badges. Additionally, the user does not feel that he or she is carrying multiple devices, because a credential device may be held or secured using a beacon device. Furthermore, in embodiments where the beacon device utilizes Bluetooth, BLE, or WiFi, costs are minimized due to the already large scale adoption of Bluetooth, BLE, and WiFi devices. Further still, in embodiments where the beacon device uses BLE for communicating with the readers of an access control system, there is a less frequent need to recharge the beacon device due to advantages of BLE low power consumption.

In operation, there are other advantages to tracking a location of a beacon device as well as tracking information for the credential device associated with and/or being held by the beacon device. In particular, a beacon device can be assigned to or implemented to carry any number of credential devices. When the beacon device initially enters an access control system having a plurality of readers, the association between the beacon device and the credential device being held by the beacon device may not be known to the access control system. However, as the beacon device and the associated credential device travel around the access control system, both devices will communicate with (or otherwise provide information to) various readers at different intervals, depending upon the communication protocols/channels used by the beacon device and the associated credential device. The location information and timing will enable association of the two devices by the access control system. Further still, if one of the beacon device and the credential device is previously known to be associated with a specific individual or user and the other of the beacon device and credential device is unassociated with a user or anonymous as tracked by the access control system, the step of associating the beacon device with the credential device will not only enable association of the two devices, but will also enable association of the user with the previously unassociated device. As described above, these communications may be used to establish an association between the beacon device and the credential device.

In some embodiments, the beacon device may communicate with a reader using, for example, BLE (e.g., transmit a BLE broadcast identifier, another beacon identifier, or another identifier) at a first time. The credential device being held by the beacon device may communicate with the reader using the same communication protocol as the beacon device, or it may communicate with the reader using, for example, 125 kHz or 13.56 MHz inductive communications (e.g., a traditional RF/inductive communication channel) when the credential device being held is placed within a very close proximity (e.g., less than 0.5 meters) of the reader. In embodiments where the beacon device uses a BLE communication protocol and the credential device uses an inductive communication channel, because the communication range of BLE is greater than that of inductive communication channels, the credential device will communicate with the same reader at a second time that is different than, and likely after, the first time. Once a reader has communicated with both a beacon device and a credential device being held by the beacon device, the information from both communications can be processed by the reader(s) and/or passed to a central host (e.g., a control panel, an access server, or another computing device) such that an association between the beacon device and the credential device being held can be positively made by the access control system. With this association, the location of the credential device being held can be surmised by tracking the location of the beacon device (which has a longer communication range). Conversely, the precise location of a beacon device can be determined based on the shorter communication range of the credential device and the association between the beacon device and the credential device. If the credential device and the beacon device use the same communication protocol or have essentially the same read range, the communication between the credential device and a reader and the beacon device and a reader may be simultaneous or near simultaneous, but one may still be tracked relative to the other.

When the beacon device is brought back to a front desk or other appropriate location for return (e.g., when it is no longer needed or being used, such as when a visitor or other individual checks out of a secure facility), then the association between the beacon device and the credential device being held by the beacon device may be erased or otherwise forgotten. The process of associating a beacon device and a credential device may begin anew when the beacon device is brought back out into the access control system (e.g. after being issued to another individual and holding another credential device) and begins communicating with readers again.

In some embodiments, because the beacon device may be communicating at longer distances than the credential device being held by the beacon device, the likelihood of the beacon device simultaneously communicating with multiple readers is higher than the likelihood of the credential device being held simultaneously communicating with multiple readers. Thus, RSSI may be used to triangulate a more precise location of the beacon device relative to the readers, even if the credential device being held is not in communication with even one reader. Other forms of triangulation and position determination can be used for the beacon device, such as AoA, ToF, phase detection, echo detection, and the like. When a beacon device is positively associated with a credential device being held, then the position of one asset can be assumed to be the relative position of the other, and the position of both devices can be assumed to be the position of the user of the devices. In this way, tracking of people and assets carrying beacon devices and credential devices being held using a communication network of readers can help facilitate location determinations for the people and assets. While associations can be inferred by tracking the communication history of both the beacon device and the credential device being held, it may also be possible to have a security administrator (e.g., an issuer of the credential device and/or of the beacon device) log the association of a beacon device and a credential device being held directly into the access control system. Thus, when the security administrator inputs the beacon device identifier/number and the associated identifier/number of the credential device being held thereby, the access control system can immediately begin inferring the location of one component when the location of the other component becomes known to the access control system, e.g. by virtue of communications with a reader.

According to aspects of the present disclosure, the reader(s) may have the capability of identifying, associating and permitting access to controlled areas by multiple devices based upon information provided by the beacon device(s), the credential device(s) and location information. The location information may be provided by the beacon and credential devices or the reader(s), or a combination of all of them. Alternatively, the reader(s) may forward information received from multiple beacon devices and credential devices to a remote access server or control panel for analysis and decision making. Optionally, if either or both the beacon device and the credential device are mobile devices, applications may be resident on these devices that provide redundant and/or additional information which may also be forwarded to the remote access server or control panel and used in making access decisions.

FIG. 1A is a diagram depicting an access control system 100 for tracking a user 102 and for authenticating a user 102 using a credential device 110, in which embodiments of the present disclosure may be implemented. In one embodiment, the access control system 100 comprises a plurality of readers 112 and at least one beacon device 108. The readers 112 may include an access data memory 116. The access data memory 116 may be configured to store location information, identification information, rules, program instructions, and/or other data associated with or useful for performing access control and asset tracking operations. In some embodiments, the reader 112 may be configured to communicate with an access data memory 118 across a communication network 128. The access data memory 116, 118 may be located remotely, locally, and/or locally and remotely, from the reader 112.

The credential device 110 may be configured, in some embodiments, to communicate with a reader 112 across one or more wireless communication connections. These one or more wireless communication connections can include communications via at least one of conventional radio protocols, proximity-based wireless communication protocols, Bluetooth, BLE, infrared, audible, NFC, RF, and other wireless communication networks and/or protocols. Although in embodiments described in detail herein the credential device 110 utilizes shorter-range wireless communication protocols such as NFC and RFID, the scope of the present disclosure is not so limited. Other communication protocols having different ranges are within the scope of the present disclosure. In some cases, communications between the credential device 110 and the reader 112 may be established automatically when the credential device 110 enters an active zone of an interrogating reader 112. In one embodiment, the active zone of the reader 112 may be defined as a three-dimensional space where the intensity of RF signals emitted by the reader 112 exceeds a threshold of sensitivity of the credential device 110 and/or where the intensity of RF signals emitted by the credential device 110 exceeds a threshold of sensitivity of the reader 112.

As noted above, the credential device 110 in some embodiments may be unpowered and may lack any electronic communication capability. In such embodiments, information may be read or otherwise extracted from the credential device 110 by a reader 112. For example, the reader 112 may comprise a barcode scanner, and the reader 112 may obtain credentials from a credential device 110 by scanning a barcode printed thereon. As another example, the reader 112 may comprise a camera or other image scanner, and may obtain credentials from a credential device 110 by taking and analyzing a picture of the credential device 110 or forwarding to server. As still another example, the reader 112 may comprise a magnetic stripe reader, and may obtain credentials from a credential device 110 when a magnetic stripe of the credential device 110 is swiped through the magnetic stripe reader.

The beacon device 108 may be configured to communicate with (or simply to transmit or broadcast information to) one or more readers 112 across one or more wireless communication channels. These channels may utilize BLE, for example, or Bluetooth, WiFi/IEEE 802.11N, or any other protocol that allows the beacon device 108 to send information to one or more readers 112 from beyond near-field range (e.g. from distances as great as fifty feet or more). The information transmitted by the beacon device 108 may comprise a BLE broadcast ID, a pseudonymous identifier, or any other unique identifier (referred to collectively herein as a "beacon ID"). The information transmitted by the beacon device 108 may also comprise, in some embodiments, a tracker ID or other identifier of a credential device 110 associated with the beacon device 108. The beacon device 108 may be incorporated into or provided in the form of a lanyard (as shown in FIG. 1A), badge holder, badge reel, or other accessory for holding the credential device 110 and/or attaching the credential device 110 to the clothing or body of the user 102. The beacon device 108 automatically transmits or broadcasts the information described above at periodic intervals, which transmissions or broadcasts may be received by one or more readers 112. The one or more readers 112 may in turn report the transmissions or broadcasts to one or more other readers 112 and/or to the access server 120. The transmissions or broadcasts may be used to identify the beacon device 108 (and, in some embodiments, the credential device 110 and/or user 102 associated therewith) and to determine the position of, or a set of possible positions of, the beacon device 108 (and thus of the credential device 110 and/or of the user 102).

In some embodiments, one or more of the components of the access control system 100 are configured to communicate across a communication network 128. The communication network 128 may utilize at least one of conventional radio networks, wireless communication networks, Zig-Bee, GSM, CDMA, WiFi, and/or other communication networks and/or protocols as provided or described herein.

Also in some embodiments, authentication may be required between the credential device 110 and the reader 112 before further communications between the credential device 110 and the reader 112 are enabled. The further communications may include communications in which access control information (e.g., keys, codes, credentials, etc.) or sensitive information is shared. In some embodiments, the authentication may be provided via one-way or mutual authentication. Examples of authentication may include, but are not limited to, simple authentication based on site codes, trusted data formats, shared secrets, and/or the like. As can be appreciated, access control information may be sensitive and may therefore require more involved validation via, for example, an encrypted exchange of access control information.

In some embodiments, the reader 112 may be configured to request access control information (e.g. credentials) from the credential device 110. This access control information may be used to validate the credential device 110 to the reader 112. Validation may include referring to information stored in access data memory 118 or some other memory associated with the reader 112. Typically, a reader 112 is associated with a particular physical or logical asset (e.g., a door protecting access to a secure room, a computer lock protecting sensitive information or computer files, a lock on a safe, and the like). In one embodiment, the credential device 110 may be validated via one or more components of the access control system 100. Once the credential device 110 is authenticated, credential information associated with the credential device 110 may be validated. During this process, the reader 112 may generate signals facilitating execution of the results of interrogating the credential device 110 (e.g., signals that engage/disengage a locking mechanism, allow/disallow movement of a monitored article, temporarily disable the reader 112, activate an alarm system, provide access to a computer system, provide access to a particular document, and the like). Alternatively, the access server 120 or some other system backend component may generate such signals.

The access server 120 may include a processor, a memory, and one or more inputs/outputs. The memory of the access server 120 may be used in connection with the execution of application programming or instructions by the processor, and for the temporary or long term storage of program instructions and/or data. As examples, the memory may comprise RAM, DRAM, SDRAM, or other solid state memory. Additionally or alternatively, the access server 120 may communicate with an access data memory 118. Like the memory of the access server 120, the access data memory 118 may comprise a solid state memory or device. The access data memory 118 may comprise a hard disk drive or other random access memory. The access server 120 may receive information from the readers 112 via the communication network 128, and may utilize that information to make position determinations. Alternatively, the information received from the readers 112 may comprise position determinations, which the access server 120 may cause to be stored in a memory thereof or in the access data memory 118. In some embodiments, the access server 120 may comprise one or more user interfaces, via which an access control system administrator can interact with (including by inputting information into and retrieving information from) the access server 120.

In some embodiments, the reader 112 may be configured to communicate with one or more devices across a communication network 128. For example, the reader 112 may communicate with a credential device 110 across the communication network 128. Among other things, this communication can allow for back-end authentication and/or provide notifications from the reader 112 to the credential device 110. The communication network 128 may comprise any type of known communication medium or collection of communication media and may use any type of protocols to transport messages between endpoints. The communication network 128 may include wired and/or wireless communication technologies. The Internet is an example of the communication network 128 that constitutes an Internet Protocol (IP) network consisting of many computers, computing networks, and other computing devices located all over the world, which are connected through many telephone systems and other means. Other examples of the communication network 128 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over Internet Protocol (VoIP) network, a cellular network, RS-232, similar networks used in access control systems between readers and control panels or access servers, and any other type of packet-switched or circuit-switched network known in the art. In addition, it can be appreciated that the communication network 128 need not be limited to any one network type, and instead may be comprised of a number of different networks and/or network types. Moreover, the communication network 128 may comprise a number of different communication media such as coaxial cable, copper cable/wire, fiber-optic cable, antennas for transmitting/receiving wireless messages, and combinations thereof.

In some embodiments, the access control system 100 may include a computing device 124, which may be used by an administrator of the access control system 100 to access and interface with the access server 120 and/or one or more readers 112. A computing device 124 may include, but is not limited to, a mobile phone, smartphone, smart watch, laptop or other mobile computer, desktop computer, tablet, mobile computer, or other device comprising a processor, a memory, and a communication interface (which may be, for example, a network interface) for communicating with one or both of the access server 120 and a reader 112 whether directly or via the communication network 128. In one embodiment, the computing device 124 may be used to receive communications sent from the beacon device 108 or the credential device 110 via the reader 112 or intended for the reader 112. In another embodiment, the computing device 124 may be configured to communicate directly with one or both of a beacon device 108 and a credential device 110.

FIG. 1B shows aspects of the system 100 in greater detail. In particular, a lanyard 104 comprises a beacon device 108 and a credential device 110. A user 102 may place the lanyard around his or her neck so that the credential device 110 is visible and so that he or she is not accidentally separated from the credential device 110 or the beacon device 108. The credential device 110, as depicted in FIG. 1B, comprises a photograph 222 of the user 102 as well as a bar code 226. The photograph 222 and the bar code 226 may be printed on disposable paper or cardstock. In other embodiments, the credential device 110 may comprise a smartcard or other device that has an internal memory for storing credentials and/or other information electronically. Such credential devices may or may not have information printed on an outer surface thereof.

The beacon device 108 is configured to communicate wirelessly with each of the readers 212A-212C utilizing BLE. The beacon device 108 can therefore communicate with each of the readers 212 from distances as great as fifty feet or more. The readers 212 (or an access server 120 with which the readers 212 are in communication) may use RSSI to determine a distance (which may be an approximate distance) between each reader 212 and the beacon device 108. This information, together with known information about the relative position of the readers 212 with respect to each other, may be used by one or more readers 212 and/or by the access server 120 to triangulate a position of the beacon device 108.

As persons of ordinary skill in the art will appreciate based on the foregoing disclosure, at least an approximate position or location of a beacon device 108 may be determined even if the beacon device 108 is unable to communicate with three readers 212. For example, if the beacon device 108 is only able to communicate with one reader 212, then such information can be used to confirm that the beacon device 108 is at least within communication range of the one reader 212. Additionally, RSSI may be used to determine a distance of the beacon device 108 from the one reader 212. Such information may be compared against a digital or electronic map of the area surrounding the one reader 212 that is stored in a memory accessible to a reader 212, the access server 120, or the computing device 124 to further narrow the potential positions of the beacon device 108 (e.g. by ruling out potential positions that are inaccessible, such as inside walls).

If, however, the beacon device 108 is able to communicate with two readers 212, then the potential position of the beacon device 108 is limited to that area where the communication ranges of the two readers 212 overlap. Here again, RSSI may be used to determine the distance of the beacon device 108 from each of the two readers 212, and the available position information may be compared to a digital or electronic map of the area surrounding the two readers so as to better ascertain the actual position of the beacon device 108.

All of the foregoing communications, determinations, and comparisons may be performed automatically, based on communications between or among the beacon device 108, the readers 212, and in some embodiments, the access server 120.

The readers 212 of FIG. 1B have the same or substantially similar components and functionality as the readers 112 of FIG. 1A, and also comprise optical scanners 214A-214C. The optical scanners 214A-214C may be used to scan the barcode 226 (or other visibly differentiating feature, such as a QR code) or the picture 222 of the credential device 110. Based on the scanned barcode 226 or picture 222, the readers 212 can determine whether or not to grant access to the user 102. The user 102 may be required, for example, to scan the barcode 226 or picture 222 with an optical scanner 214 of a reader 212 in order to pass from one area of a secure facility to another (e.g., from a hallway into a room, from one room into another room, from a room into a hallway). In some embodiments, an access server 120 makes the determination of whether or not to grant access to the user 102 based on information received from the readers 212, and transmits that determination to the readers 212 for implementation by the readers 212. In addition to making an access control decision, when a user 102 presents the credential device 110 to a reader 212 and the reader 212 scans the barcode 226 or picture 222, the reader 212 (or the access server 120) may automatically determine that the credential device 110—and thus the beacon device 108 and the user 102) is within optical scanning range of the reader 212.

This information may be used not only to determine the present position of the beacon device 108, but also to eliminate, within a certain time period after the barcode 126 is scanned, potential positions of the beacon device 108 (e.g. when there is uncertainty regarding the position of the beacon device 108 because the beacon device 108 is not in communication with at least three readers 212). For example, if available RSSI, ToF, AoA, phase detection, and/or echo detection information indicates that the beacon device 108 must be in one of two positions—the first of which is readily accessible from the location of the reader 212 at which the credential device 110 corresponding to the beacon device 108 was recently scanned, and the second of which is inaccessible (at least during the time that has passed since the scanning of the credential device 110) from the same location—then the second position may be ruled out as a possible location of the credential device 110, the beacon device 108, and the user 102.

Figure 1C:
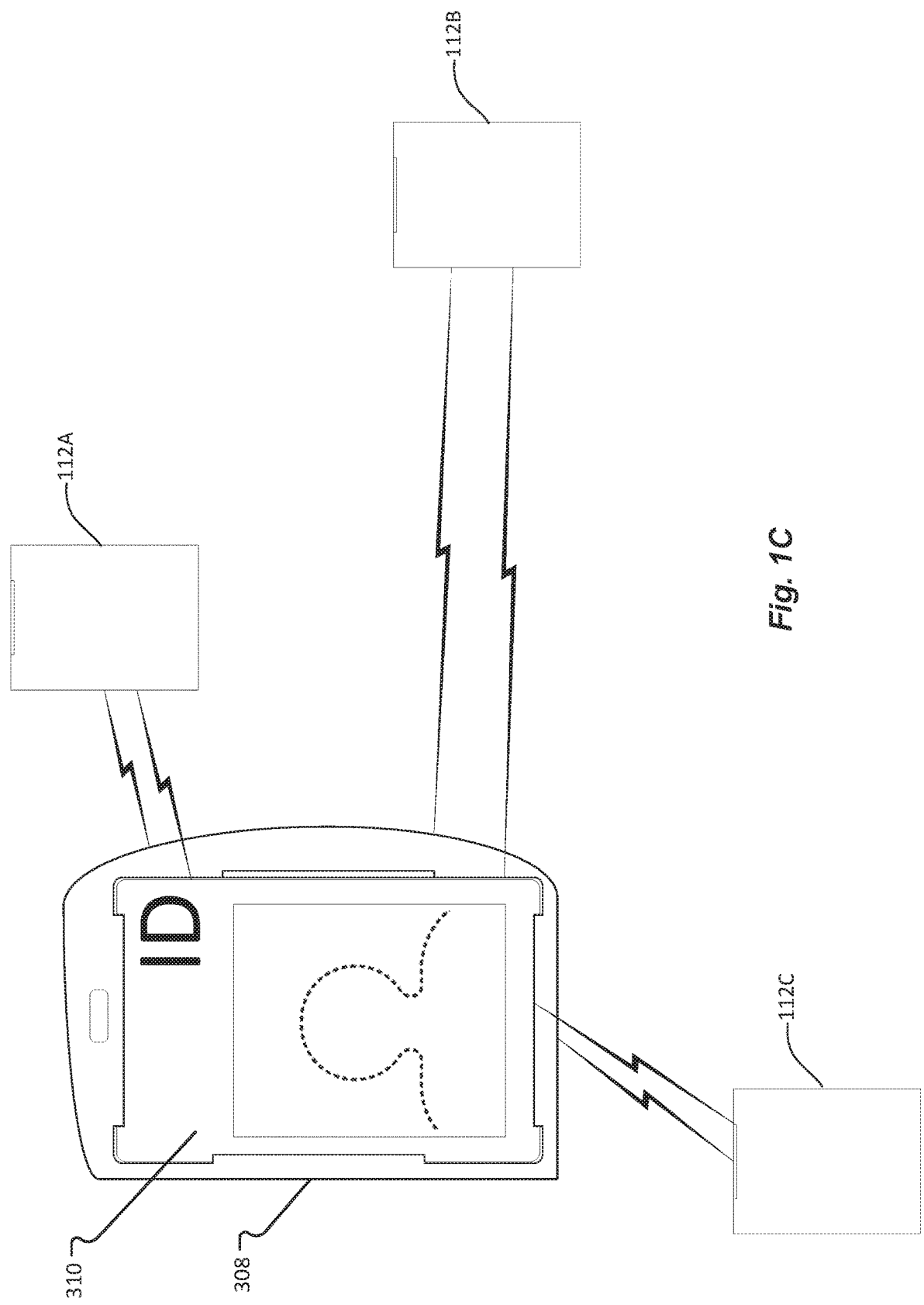
FIG. 1C is a diagram depicting aspects of an access control system according to at least another embodiment of the present disclosure.

FIG. 1C depicts a beacon device 308 in the form of a badge holder, configured to securely hold the credential device 310. The credential device 310 is a smartcard comprising circuitry that enables it to store credentials electronically, which credentials can be read by or transmitted to the readers 112A-112C via a wireless communication channel. As with the beacon device 108, the beacon device 308 utilizes BLE or another beyond-near-field wireless communication protocol for periodic broadcasts. The credential device 310, on the other hand, uses a range-limited wireless communication protocol (e.g. RFID, NFC) for communicating credentials and/or other information to the readers 112. Thus, while the readers 212 illustrated in FIG. 1B included optical scanners 214 to scan the barcode 226 or the picture 222 of the credential device 110, the readers 112 communicate wirelessly with the credential device 310. In all other respects, the components depicted in FIG. 1C interact in the same or in a substantially similar manner as the components depicted in FIG. 1B, with the readers 112 and/or an access server 120 and/or a computing device 124 making access control decisions based upon credentials received by the readers 112 from the credential device 310, and the readers 112 and/or the access server 120 and/or the computing device 124 also making position determinations based on communications received at the readers 112 from one or both of the beacon device 308 and the credential device 310.

Figure 2:
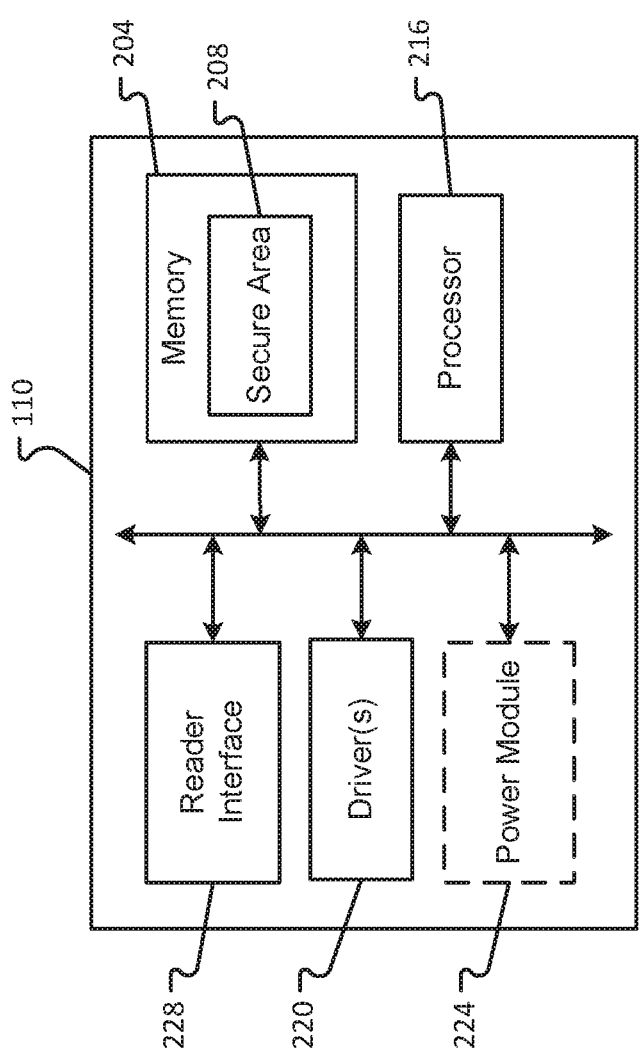
FIG. 2 is a block diagram depicting a credential device according to at least one embodiment of the present disclosure.

FIG. 2 shows a block diagram depicting a credential device 110 in accordance with some embodiments of the present disclosure. Although the illustrated credential device 110 comprises a processor in addition to various other components, credential devices 110 according to other embodiments of the present disclosure may not include a processor, and may even be a piece of paper or other material with information (e.g. text, a barcode, an image) provided on a surface thereof.

The credential device 110 of FIG. 2 may be provided with a secure area 208 that stores one or a plurality of access credentials and/or other sensitive information. The credentials and/or other sensitive information may be communicated to a reader 112 in connection with a holder of the credential device 110 attempting to gain access to an asset protected by the reader 112. As an example, the credential device 110 may be presented to the reader 112 by a user 102.

If the credential device 110 is configured to communicate credentials and/or other information stored therein to a reader 112 using an NFC protocol, then the reader 112 and credential device 110 may have their interfaces/antennas inductively coupled to one another, at which point the reader 112 and/or credential device 110 will authenticate or mutually authenticate with one another. Following authentication, the reader 112 may request credentials from the credential device 110, or the credential device 110 may offer the credentials stored therein to the reader 112. Upon receiving the credentials from the credential device 110, the reader 112 may analyze the credentials and determine whether the credentials are valid and, if so, allow the holder/user of the credential device 110 access to the asset protected by the reader 112. It should be appreciated that the credential device 110 may alternatively or additionally be configured to analyze information received from the reader 112 in connection with making an access control decision and/or in connection with making a decision whether or not to provide credentials to the reader 112. Examples of technologies that can be used by the credential device 110 to make an access control decision for itself are further described in U.S. Pat. No. 8,074,271 to Davis et al. and U.S. Pat. No. 7,706,778 to Lowe, both of which are hereby incorporated herein by reference in their entirety.

The credential device 110 of FIG. 2 is shown to include memory 204, a processor 216, one or more drivers 220, a reader interface 228, and a power module 224.

The memory 204 may correspond to any type of non-transitory computer-readable medium. In some embodiments, the memory 204 may comprise volatile or non-volatile memory and a controller for the same. Non-limiting examples of memory 204 that may be utilized in the credential device 110 include RAM, ROM, buffer memory, flash memory, solid-state memory, or variants thereof. Whether or not the secure area 208 or not, the memory 204 may store, in some embodiments, a tracker ID of the credential device 110, information about a beacon device 108 associated with the credential device 110, information about a user 102 associated with the credential device 110, and/or instructions for execution by the processor 216.

The processor 216 may correspond to one or many microprocessors that are contained within the housing of the credential device 110 with the memory 204. In some embodiments, the processor 216 incorporates the functions of a Central Processing Unit (CPU) on a single Integrated Circuit (IC) or a few IC chips. The processor 216 may be a multipurpose, programmable device that accepts digital data as input, processes the digital data according to instructions stored in its internal memory, and provides results as output. The processor 216 implements sequential digital logic as it has internal memory. As with most known microprocessors, the processor 216 may operate on numbers and symbols represented in the binary numeral system.

The driver(s) 220 may correspond to hardware, software, and/or controllers that provide specific instructions to hardware components of the credential device 110, thereby facilitating their operation. For instance, the reader interface 228 may have a dedicated driver 220 that provides appropriate control signals to effect its operation. The driver(s) 220 may also comprise the software or logic circuits that ensure the various hardware components are controlled appropriately and in accordance with desired protocols. For instance, the driver 220 of the reader interface 228 may be adapted to ensure that the reader interface 228 follows the appropriate proximity-based protocols (e.g., NFC, RFID, Infrared, Ultrasonic, etc.) such that the reader interface 228 can exchange communications with a reader 112. As can be appreciated, the driver(s) 220 may also be configured to control wired hardware components (e.g., a USB driver, an Ethernet driver, etc.).

The reader interface 228 may correspond to the hardware that facilitates communications with the credential device 110. The reader interface 228 may include an RFID interface (e.g., antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the reader interface 228 is specifically provided to facilitate proximity-based communications with a reader 112 via a communication channel or multiple communication channels. Also in some embodiments, the reader interface 228 may facilitate communications with a reader using any of the protocols described herein for use by a beacon device 108 for communicating with a reader 112.

In embodiments of the credential device 110 that include a power module 224, the power module 224 may include a built-in power supply (e.g., battery) and/or a power converter or generator that generates electrical energy from another form of energy. In some embodiments, the power module 224 may also include some implementation of surge protection circuitry to protect the components of the credential device 110 from power surges.

Figure 3:
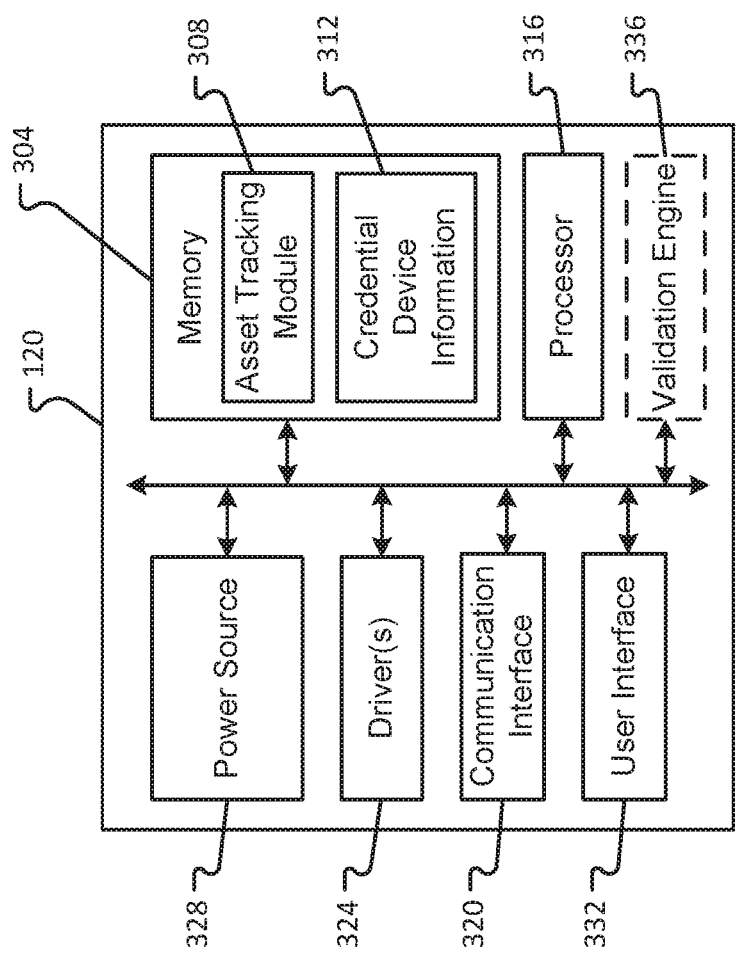
FIG. 3 is a block diagram depicting an access control server according to at least one embodiment of the present disclosure.

Referring now to FIG. 3, the access server 120, which may or may not be in wired or wireless communication with one or more of the reader(s) 112, includes a memory 304, a processor 316, a communication interface 320, one or more driver(s) 324, a power source 328, and a user interface 332.

The memory 304 of the access server 120 may correspond to any type of non-transitory computer-readable medium. In some embodiments, the memory 304 may comprise volatile or non-volatile memory and a controller for the same. Non-limiting examples of memory 304 that may be utilized in the access server 120 include RAM, DRAM, SDRAM, ROM, buffer memory, flash memory, solid-state memory, or variants thereof. In some embodiments, the memory 304 may be or comprise a hard disk.

The memory 304 may be used in connection with the execution of application programming or instructions by the processor 316. For example, the memory 304 may store instructions for execution by the processor 316. The memory 304 may also be used, for example, for the temporary or long term storage of data, including, for example, historical configuration information, historical credential information, and one or more metrics regarding the use and/or functioning of one or more readers 112.

The memory 304 stores information relevant to the tracking of assets utilizing the access control system 100 and the administration of the access control system 100, such as asset tracking module 308 and/or credential device information 316. The asset tracking module 308 may comprise instructions for calculating or otherwise determining a position or a set of possible positions of a beacon device 108. For example, the access control module 308 may comprise instructions for applying techniques such as RSSI, triangulation, phase detection, and echo detection to determine a position or a set of possible positions of a beacon device 108. Additionally, the access control module 308 may comprise instructions for comparing a first position determination (or determination of a set of possible positions) based on a first transmission from the beacon device 108 with a second position determination (or determination of a set of possible positions) based on a second transmission of the beacon device 108, and for generating a "track" of the beacon device 108 (e.g. a likely path of the beacon device 108 over time based on periodic position determinations and, in some embodiments, a digital or electronic map of the facility secured by the access control system) and/or eliminating one or more possible positions from the first and second sets of possible positions (e.g., those positions that the beacon device could not logically occupy at the first and second times). The access control module 308 may further comprise instructions for comparing a position determination based on an interaction of a reader 112 with a credential device 110 at a first time with a determination of a set of possible positions based on a transmission from the beacon device 108 corresponding to the credential device 110 at a second time, and for eliminating one or more possible positions from the set of possible positions (e.g. those possible positions that the beacon device 108 could not logically occupy given the location of the reader 112 that interacted with the credential device 110 and the amount of time that passed between the first time and the second time).

The credential device information 312 may comprise information about one or more currently authorized credential devices 110. Such information may include, for example, information about one or more authorized credentials that are linked with or have been provided to each credential device 110. Such information may also include, for example, identification or descriptive information about each credential device 110, information about which credential device 110 is associated with which beacon device 108, and/or information about which individual is associated with which credential device 110.

The communication interface 320 may correspond to the hardware that facilitates communications with one or more of the reader(s) 112 and/or the computing device 124. The communication interface 320 may include one or more of a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), an Ultrasonic interface (e.g., speaker, microphone, and associated circuitry), or any other suitable interface for enabling communications with the readers 112 and/or the computing device 124. In some embodiments, the communication interface 320 may enable communications with one or both of credential devices 110 and beacon devices 108, e.g. to allow an access control system administrator to read information from a credential device 110, provide a tracker ID 428 to a beacon device 108, obtain a beacon ID 424 from a beacon device 108 for establishing an association between the beacon device 108 and a credential device 110, or for any other communications needed to implement the systems and methods described herein.

The user interface 332 may comprise one or more user input devices and/or one or more user output devices. Examples of suitable user input devices that may be included in the user interface 332 include, without limitation, one or more of a keyboard, mouse, button, touch-sensitive surface, pen, camera, microphone, etc. Examples of suitable user output devices that may be included in the user interface 332 include, without limitation, display screens, touchscreens, lights, speakers, etc. It should be appreciated that the user interface 332 may also include a combined user input and user output device, such as a touch-sensitive display or the like. The user interface 332 may allow a system administrator to modify the credential device information 312, e.g. by providing or changing credential device information, establishing or removing associations between credential devices 110 and beacon devices 108, and/or establishing or removing associations between individuals (or identifying information corresponding to individuals) and credential devices 110.

The power source 328 may include a built-in power supply (e.g., a battery) and/or a generator or other energy production device for generating electricity (e.g. a solar cell). Alternatively, the power source 328 may comprise an interface for receiving power from an electrical outlet. In some embodiments, the power source 328 may also include some implementation of surge protection circuitry to protect the components of the mobile device 108 from power surges. Also in some embodiments, the power source 328 may comprise circuitry for converting incoming alternating current to direct current for powering the various components of the access server 120.

The processor 316 and the driver(s) 324 may be substantially similar or identical to the processor 216 and the driver(s) 220.

Figure 4:
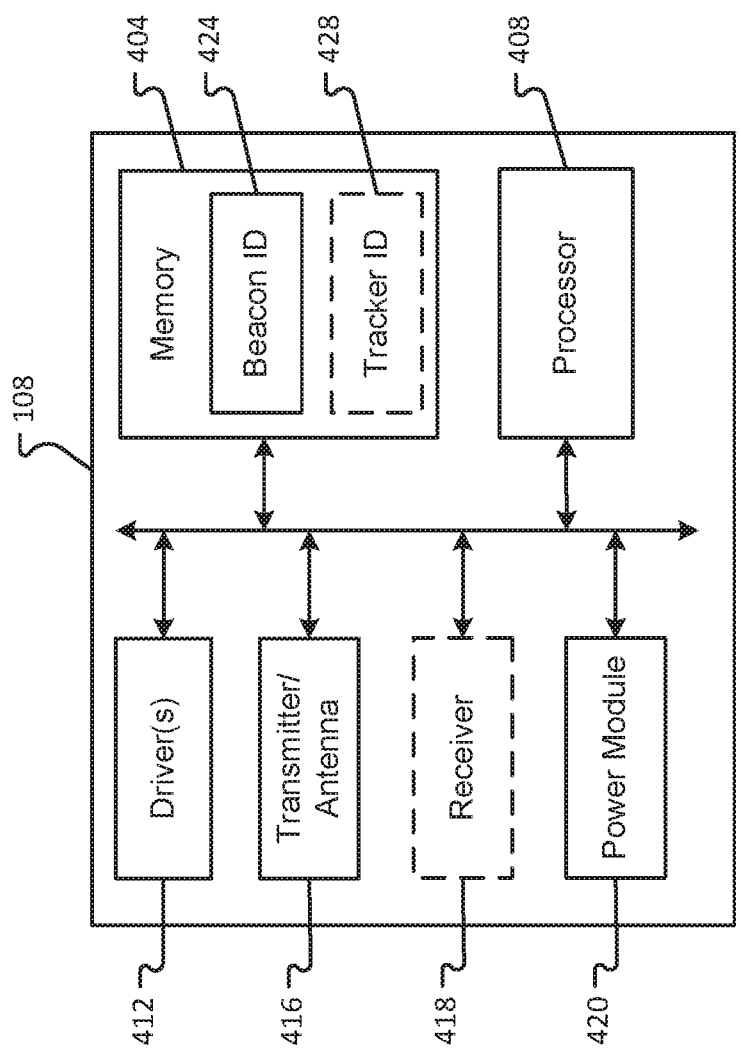
FIG. 4 is a block diagram depicting a beacon device according to at least one embodiment of the present disclosure.

With reference now to FIG. 4, a beacon device 108 (or 308) may comprise a memory 404, a processor 408, one or more drivers 412, a transmitter/antenna 416, and a power module 420. The memory 404 may correspond to any type of non-transitory computer-readable medium. In some embodiments, the memory 204 may comprise volatile or non-volatile memory and a controller for the same. Non-limiting examples of memory 204 that may be utilized in the mobile device 108 include RAM, ROM, buffer memory, flash memory, solid-state memory, or variants thereof.

The memory 404 stores, among other things, a unique beacon ID 424. The memory 404 may also store a tracker ID 428 that corresponds to a credential device 110 or 310 associated with the beacon device 108. One or more drivers 412, as well as instructions for execution by the processor 408, may also be stored in the memory 404.

The processor 408 may correspond to one or many microprocessors that are contained within the housing of the beacon device 108 with the memory 404. In some embodiments, the processor 408 incorporates the functions of a Central Processing Unit (CPU) on a single Integrated Circuit (IC) or on multiple IC chips. The processor 408 may be a multipurpose, programmable device that accepts digital data as input, processes the digital data according to instructions stored in its internal memory, and provides results as output. The processor 408 implements sequential digital logic as it has internal memory. As with most known microprocessors, the processor 408 may operate on numbers and symbols represented in the binary numeral system. In particular, the processor 408 may cause the transmitter/antenna 416 to periodically broadcast a signal that may be received by one or more readers 112 and used for determining a location or a set of possible locations of the beacon device 108.

The drivers 412 may correspond to hardware, software, and/or controllers that provide specific instructions to hardware components of the beacon device 108, thereby facilitating their operation. For instance, the transmitter/antenna 416 and the receiver 418 may each have a dedicated driver 412 that provides appropriate control signals to effect its operation. The driver(s) 412 may also comprise the software or logic circuits that ensure the various hardware components are controlled appropriately and in accordance with desired protocols. For instance, the driver 412 of the transmitter/antenna 416 may be adapted to ensure that the transmitter/antenna 416 transmits signals using the BLE protocol such that readers 112 or 212 are able to receive and appropriately analyze the signals.

The transmitter/antenna 416, under control of the processor 408, periodically (or at non-uniform intervals) broadcasts a signal that may, in some embodiments, include the beacon ID 424. Readers 112 or 212 that receive the signal use the signal to determine the location (or the possible locations) of the beacon device 108. If the signal includes the beacon ID 424, then the readers 112 or 212 can determine which beacon device 108 is at the determined location or possible locations. If the signal does not include the beacon ID 424 (or, in embodiments, where the memory 404 also stores a tracker ID 428, if the signal includes the beacon ID 424 but not the tracker ID 428), then a reader 112 or 212 may establish a connection with the beacon device 108 to retrieve the beacon ID 424 (or the tracker ID 428) from the memory 404 of the beacon device 108. In such embodiments, however, the beacon device 108 also includes a receiver 418, via which the beacon device 108 may receive, for example, a read command from a reader 112.

The power module 420 may include a built-in power supply (e.g., a battery) and/or a generator or other energy production device for generating electricity (e.g. a solar cell). In some embodiments, the power module 420 may also include some implementation of surge protection circuitry to protect the components of the mobile device 108 from power surges.

Figure 5:
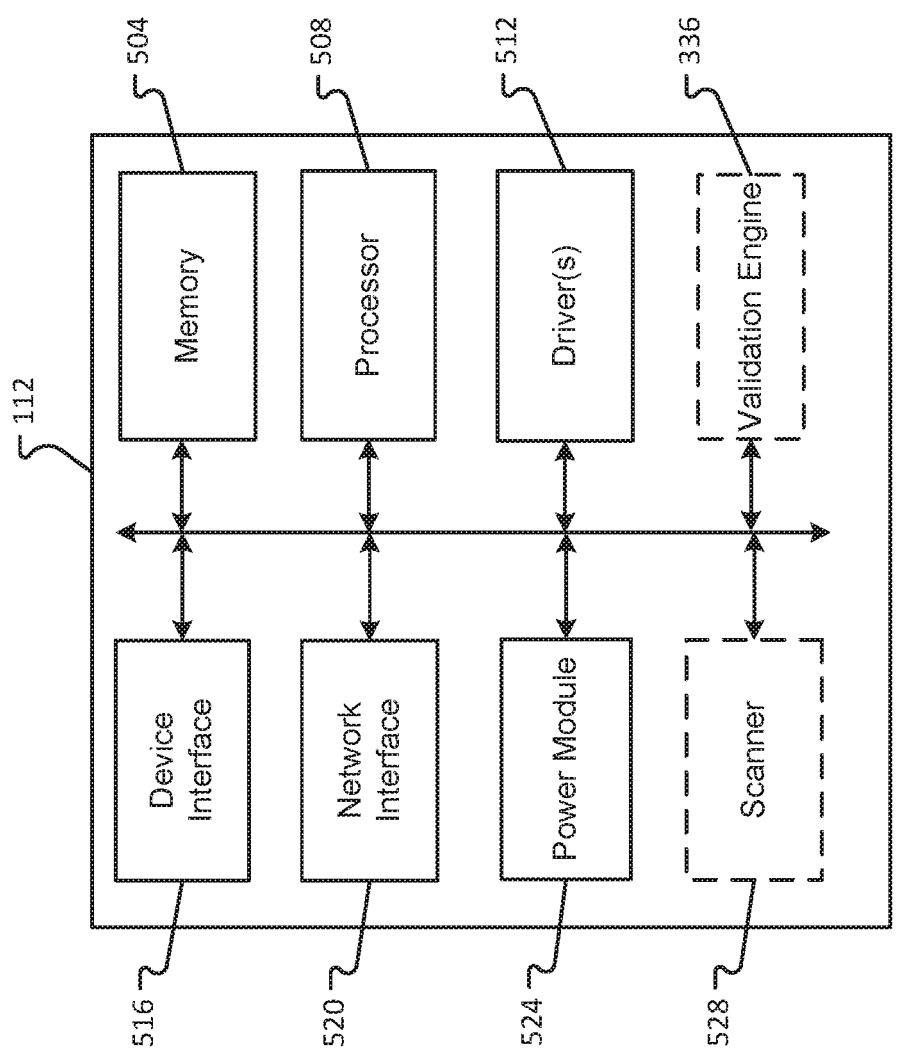
FIG. 5 is a block diagram depicting a reader according to at least one embodiment of the present disclosure.

Referring now to FIG. 5, a reader 112 (or 212) according to embodiments of the present disclosure may comprise a memory 504, a processor 508, one or more driver(s) 512, a device interface 516, a network interface 520, a power module 524, and, in some embodiments, a barcode scanner 528.

Like the memory 404, the memory 504 may correspond to any type of non-transitory computer-readable medium. The memory 504 may be located locally or remotely to the other components of the reader 112. In some embodiments, the memory 504 may comprise volatile or non-volatile memory and a controller for the same. Non-limiting examples of memory 504 that may be utilized in the reader 112 include RAM, ROM, buffer memory, flash memory, solid-state memory, or variants thereof.

The memory 504 may store the one or more drivers 512 as well as instructions for execution by the processor 508 that, when executed by the processor 508, enable the reader 112 to communication with one or more beacon devices 108 and/or one or more credential devices 110. In some embodiments, the instructions may further enable the reader 112 to communicate information about transmissions received from one or more beacon devices 108 and/or credential devices 110 to other readers 112, to an access server 120, and/or to a computing device 124. The memory 504 may further store instructions for enabling the reader 112 to determine a distance to a beacon device 108 using RSSI, and/or to triangulate a position of a beacon device 108, and/or to engage in any other communications or make any other determinations described herein. Additionally, the memory 504 may store information associating a beacon device 108 with a credential device 110, and/or information associating a credential device 110 with a visitor or other user 102. The memory 504 may yet further store instructions for enabling the reader 112 to establish an association between a beacon device 108 and a credential device 110.

The processor 508 may correspond to one or multiple microprocessors that are contained within the housing of the reader 112. In some embodiments, the processor 508 incorporates the functions of a Central Processing Unit (CPU) on a single Integrated Circuit (IC) or a few IC chips. The processor 508 may be a multipurpose, programmable device that accepts digital data as input, processes the digital data according to instructions stored in its internal memory, and provides results as output. The processor 508 implements sequential digital logic as it has internal memory. As with most known microprocessors, the processor 508 may operate on numbers and symbols represented in the binary numeral system.

The driver(s) 512 may correspond to hardware, software, and/or controllers that provide specific instructions to hardware components of the reader 112, thereby facilitating their operation. For instance, the device interface 516 and network interface 520 may each have a dedicated driver 512 that provides appropriate control signals to effect its operation. The driver(s) 512 may also comprise the software or logic circuits that ensure the various hardware components are controlled appropriately and in accordance with desired protocols. For instance, the driver 512 of the device interface 516 may be adapted to ensure that the device interface 516 follows the appropriate communication protocols (e.g., BLE, NFC, Infrared, Ultrasonic, WiFi/IEEE 802.11N, etc.) such that the device interface 516 can exchange communications with credential devices 110 and beacon devices 108. Likewise, the driver 512 of the network interface 520 may be adapted to ensure that the network interface 520 follows the appropriate network communication protocols (e.g., TCP/IP (at one or more layers in the OSI model), UDP, RTP, GSM, LTE, Wi-Fi, etc.) such that the network interface 520 can exchange communications via a communication network such as the communication network 128. As can be appreciated, the driver(s) 512 may also be configured to control wired hardware components (e.g., a USB driver, an Ethernet driver, etc.).

The device interface 516 may correspond to the hardware that facilitates communications between the reader 112 and one or more beacon devices 108 or credential devices 110. The device interface 516 may include a Bluetooth interface (e.g., antenna and associated circuitry), a WiFi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the device interface 516 is specifically provided to facilitate proximity-based communications with a credential device 110 via a communication channel or multiple communication channels.

The network interface 520 may comprise hardware that facilitates communications with other devices over a communication network such as the communication network 128. The reader 112 may, for example, maintain communications with an access server such as access server 120, with other readers 112, and/or with one or more services or data sources accessible via the communication network 128 (e.g. a web-based clock service, a remote memory such as access data memory 118, and so forth). The network interface 520 may include an Ethernet port, a WiFi card, a Network Interface Card (NIC), a cellular interface (e.g., antenna, filters, and associated circuitry), or the like. The network interface 520 may further be configured to encode and decode communications (e.g., packets) according to a protocol utilized by the communication network 128, and/or to encrypt or decrypt secure communications.

The power module 524 may include a built-in power supply (e.g., battery) and/or a power converter that facilitates the conversion of externally-supplied AC power into DC power that is used to power the various components of the reader 112. In some embodiments, the power module 524 may also include some implementation of surge protection circuitry to protect the components of the reader 112 from power surges.

In some embodiments, the reader 112 comprises a scanner 528. The scanner 528 may be a 1-dimensional or 2-dimensional bar code scanner, an image scanner, a laser scanner, a magnetic stripe reader, or any other scanner or reader suitable for obtaining information from a credential device 110 that is not configured for wireless or electronic communication (or from a credential device 110 that is configured for wireless or electronic communication, but that also comprises one or more non-electronic means of encoding information, such as a printed 1-dimensional barcode, a printed 2-dimensional barcode, printed text, a printed image, and/or a magnetic stripe. The scanner 528 may comprise both hardware and software. The scanner 528 may scan continuously, or the scanner 528 may comprise a motion detector that causes the scanner 528 to scan only when nearby motion is detected. As another alternative, the scanner 528 may be configured to scan continuously during predetermined time periods. As still another alternative, the scanner 528 may be configured to scan when a button on the reader 112 is pressed, when an on/off switch is turned on, or upon receipt of another input.

Figure 6:
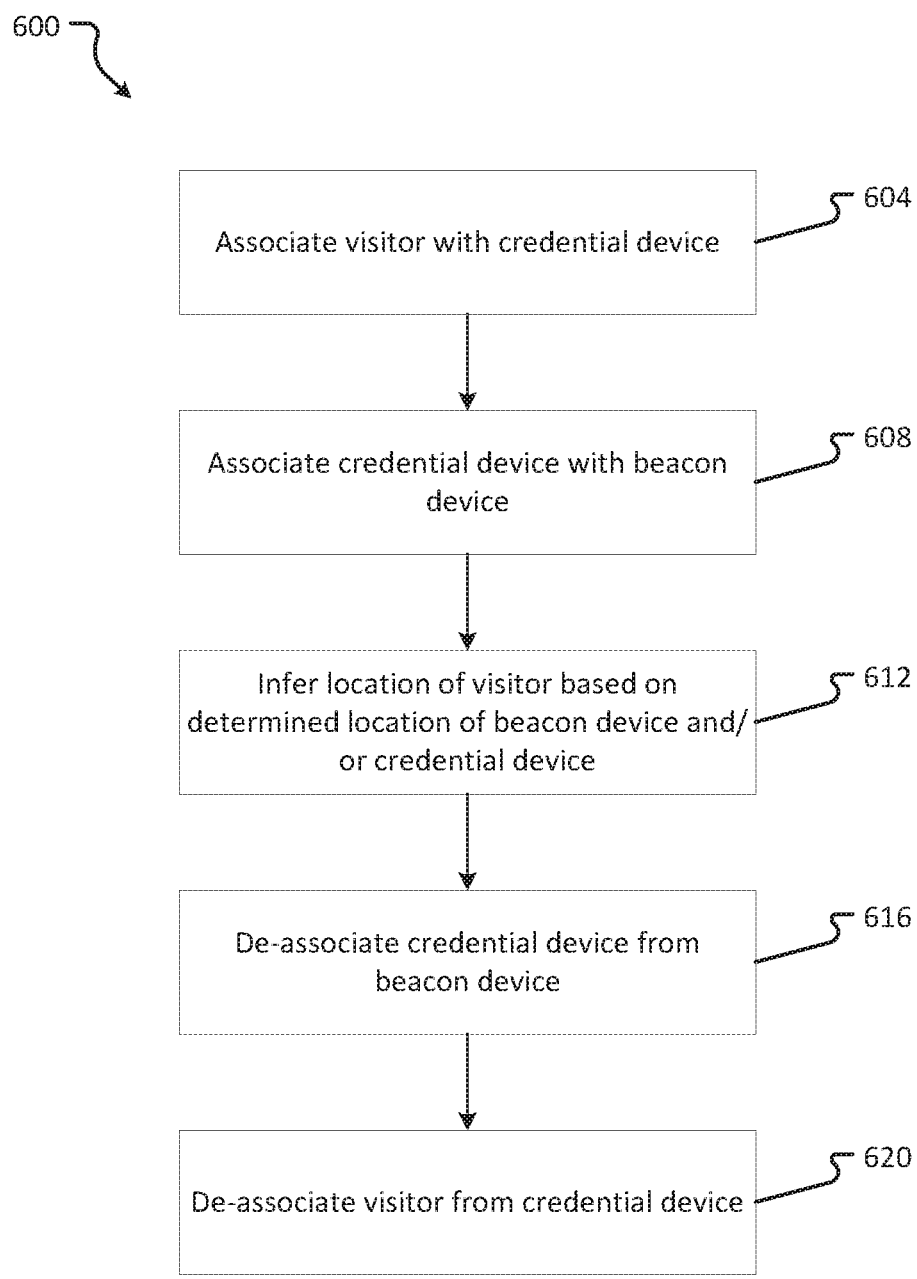
FIG. 6 is a flowchart depicting a method according to at least one embodiment of the present disclosure.

Referring now to FIG. 6, a method 600 according to at least one embodiment of the present disclosure may comprise associating a visitor with a credential device (step 604). The association may be made on a computing device, which may be, for example, an access server 120 or a computing device 124. For example, a visitor to a secured facility may provide his or her identification information (e.g. a name, a driver's license, and/or a passport) to an access control system administrator (who may be, for example, a security guard and/or a receptionist). The access control system administrator may enter the name and/or other identification information of the visitor in the access server 120 or the computing device 124, which may automatically associate the visitor's name with a particular credential device 110. For example, the credential device 110 may be associated with a tracker ID 428, and a database stored on or by the access server 120 may store the tracker IDs 428 associated with every credential device 110 used by the access control system 100. The access control system administrator may enter the visitor identification information into the database, which may then associate the visitor identification information with the tracker ID 428 of a credential device 110 that is not already associated with another individual.

In some embodiments, the access control system administrator may associate a visitor with a credential device 110 by locating an available credential device 110 and scanning a barcode thereon (e.g. with a scanner similar to the scanner 528), tapping the credential device 110 on a near-field computing device to cause the credential device 110 to transmit its tracker ID 428 to the near-field computing device (which may, in turn, be in communication with the access server 120), or otherwise read a tracker ID 428 from the credential device 110. This may cause the access server 120 (or the computing device 124) to open a dialogue box into which the system administrator can enter identification information of a visitor to be associated with the credential device 110, which information and association can then be saved.

In other embodiments, an access control system administrator may associate a visitor with a credential device 110 by entering one or more pieces of visitor identification information (e.g. name, telephone number, email address, or visitor image) into a spreadsheet or database that contains the tracker IDs 428 of the credential devices 110 that are used with the access control system 100. For example, if each row of a first column of a spreadsheet contains a tracker ID 428 of credential device 110 that is used with the access control system, then the access control administrator may associate a visitor with one of the tracker IDs 428 (and thus with one of the credential devices 110) by entering the visitor's identification information in the same row as the tracker ID 428 in question but in a second column of the spreadsheet. With such a spreadsheet, the access control administrator can readily determine which tracker IDs 428 are not currently associated with anyone (and are therefore available to be associated with a visitor) by identifying blank cells in the second column of the spreadsheet.

In addition to associating a visitor with a credential device 110, the method 600 may comprise associating the credential device 110 with a beacon device 108 (step 608). The beacon device 108 may have the form factor of, for example, a lanyard (or a lanyard attachment), a badge holder, or a retractable badge reel. Thus, the credential device 110 may be physically associated with the beacon device 108 by attaching the credential device 110 to the beacon device 108.

In some embodiments, the credential device 110 may also be associated with the beacon device 108 by causing the tracker ID 428 of the credential device 110 to be stored in the memory 404 of the beacon device 108. For this to occur, the access control system administrator may manually provide the beacon ID 424 of the beacon device 108 in question to the access server 120. The access server 120 may then transmit the tracker ID 428 and the beacon ID 424 to one or more readers 112 over the communication network 128, one or more of which readers 112 may then transmit the tracker ID 428 (e.g. as part of a memory write command) to the beacon device 108 (using the beacon ID 424 to send the tracker ID 428 to the proper beacon device 108), using a device interface 516. In other embodiments, the access control system administrator may cause the computing device 124 or the access server 120 to generate a beacon ID 424 and to transmit the generated beacon ID 424 to the beacon device 108, which may then adopt the generated beacon ID 424 for at least as long as the beacon device 108 is associated with the credential device 110. In still other embodiments, the access server 120 or the computing device 124 may transmit the tracker ID 428 of the credential device 110 to the beacon device 108, which may then adopt the tracker ID 428 as the beacon ID 424 for at least as long as the beacon device 108 is associated with the credential device 110 having the tracker ID 428.

Alternatively, an access control system 100 may be configured to automatically determine which credential device 110 is associated with a beacon device 108 by comparing the amount of time that passes between a first communication between a given reader 112 and a beacon device 108 on the one hand and a first communication between the given reader 112 and a credential device 110 on the other. Because the beacon device 108 is equipped with beyond-NFC communication capabilities, it will typically communicate with the reader 112 before the credential device 110 communicates with the reader. Thus, the access control system 100 may be configured to associate a credential device 110 with a beacon device 108 if the first communication with each of the two devices occurs within a given amount of time of the other, where the amount of time depends on the difference in communication range of the beacon device 108 and the credential device 110. Once the backend portion of the access control system 100 (e.g. the readers 112 and/or the access server 120) associates the beacon device 108 with the credential device 110, one or more of the readers 112 may send a write-to-memory command to the beacon device 108 that causes the beacon device 108 to store the tracker ID 428 of the associated credential device 110 in the memory 404 of the beacon device 108. Alternatively, the beacon device 108 may request the tracker ID 428 of the associated credential device 110 from one or more of the readers 112, and may store that tracker ID 428 in the memory 404 of the beacon device 108 upon receipt of the tracker ID 428.

As another alternative, an access control system 100 may be configured such that beacon devices 108 used with the system 100 transmit an indication of whether they are or are not associated with a credential device 110. The indication may be as simple as, for example, the absence of a tracker ID 428 in transmissions made by the beacon device 108. The indication may also be, as another example, an affirmative indication (e.g. a predetermined code) that the beacon device 108 has not been associated with a credential device 110. Then, when a reader 112 receives a signal from a beacon device 108 that comprises an indication that the beacon device 108 is not associated with a credential device 110, the system 100 may be configured to automatically associate the next unrecognized tracker ID 428 (e.g. the next tracker ID 428 that has not already been associated with a beacon device 108) with the beacon device 108 from which the indication was received.

In some embodiments, the association of the beacon device 108 and the credential device 110 may be tracked by the beacon device 108 (e.g. by storing the tracker ID 428 of the associated credential device 110 in the memory 404 of the beacon device 108). In other embodiments, however, the association of the beacon device 108 and the credential device 110 may be maintained solely in the backend portion of the access control system 100.

The method 600 also comprises inferring the location of a visitor based on a determined location of the beacon device and/or a credential device (step 612). In embodiments where the beacon device 108 stores, in the memory 404 thereof, a tracker ID 428 of an associated credential device 110, the beacon device 108 may periodically transmit the tracker ID 428 (together with the beacon ID 424, in some embodiments). In embodiments where the beacon device 108 does not store a tracker ID 428, the beacon device 108 periodically transmits its beacon ID 424. When one or more readers 112 within communication range of a beacon device 108 receive a transmitted signal from the beacon device 108, the one or more readers (which may communicate with each other directly, or via the communication network 128) or the access server 120 or the computing device 124 (using information received from the one or more readers 112) calculate a position or a plurality of possible positions of the beacon device 108 using known techniques for determining or triangulating position, including, for example, one or more of RSSI, triangulation, phase detection, and echo detection. The reader(s) 112 and/or the access server 120 also determine which tracker ID 428 is associated with the beacon device 108, and based on that determination, infer a location (or a plurality of possible locations) of the visitor that is associated with the credential device 110 having the tracker ID 428.

When a reader 112 communicates (or obtains information from) a credential device 110, the reader 112 (or the access server 120, based on information received from the reader 112) determines which visitor is associated with the credential device 110, and infers that the visitor is located in the immediate vicinity of the reader 112 (because the credential device 110 utilizes NFC or a similar short-range communication protocol, or because the credential device 110 must be physically placed adjacent the reader 112 to be scanned).

As persons of ordinary skill in the art will appreciate, the receipt by the readers 112 of periodic transmissions from the beacon device 112, together with the occasional gathering of information from the credential device 110 itself (whether through wireless, short range communications or by scanning the credential device 110) allows multiple inferences to be made regarding the location of a visitor associated with the credential device 110, which inferences may be used to inform future location determinations and inferences for the visitor in question. For example, the gathering of information from a credential device 110 provides a basis for highly certain visitor location inferences. These highly certain location inferences may be used by the readers 112 and/or the access server 120 to eliminate nonsensical potential location determinations or inferences. For example, a visitor may scan his or her credential device 110 at a first time, resulting in a highly certain location inference. Then, at a second time shortly thereafter, a reader 112 may receive a broadcast signal from the beacon device 108 associated with the visitor's credential device 110 that results in two or more potential position determinations. The reader 112 (or the access server 120) may then use the highly certain location inference to eliminate any of the potential position determinations that would require the visitor to have gone farther or moved faster than is physically possible (or, in some embodiments, than is likely) in the amount of time that has passed since the highly certain location inference was made.

In some embodiments, the access control system 100 may store each location determination or inference for each visitor, and may use the stored location determinations or inferences to create a track of the visitor's movement. The stored location determinations or inferences and/or the track of the visitor's movement may be accessible to an access control system administrator via the access server 120 and/or the computing device 124. In some embodiments, the access control system 100 may only store the location determinations or inferences corresponding to a particular visitor for a given amount of time (e.g. 30 minutes, 1 hour, 2 hours, 1 day, 1 week, or 1 month). In still other embodiments, the access control system 100 may simply replace each location determination or inference with a new location determination or inference at the time the new location determination or inference is made.

The access control system 100 may further be configured to use location determinations and inferences for security purposes. For example, the access control system 100 may be configured to sound an alarm if it infers or determines that a visitor is located in an area of a secure facility in which the visitor is not authorized to be. As another example, the access control system 100 may be configured to send a message (e.g. an email or a text message) if it infers or determines that a visitor is in an unauthorized location of a secure facility.

The access control system 100 may also be configured to terminate access authorizations if it is determined that the beacon device 108 and credential device 110 are not at the same location. For example, if the beacon device 108 communicates with a first reader 112 and the credential device 110 communicates with a second reader 112 that is outside of the communication range of a beacon device 108 communicating with the first reader 112, then the access control system 100 may determine that the credential device 110 has been separate from the beacon device 108.

If a determination is made that a credential device 110 has been separated from a beacon device 108, then the access control system 100 may change the access authorization of the credential device 110, for example by preventing each of the readers 112 from granting access based on credentials provided by the credential device 110, or by otherwise disabling the ability of the credential device 110 from being used to obtain access to the secure facility (or any portion thereof) protected by the access control system 100. Additionally, the access server 120, the computing device 124, or another component of the access control system 100 may, for example, send an electronic message (e.g. an email or a text message) or an automatically generated voice message, display a message on a graphical user interface, make an announcement (e.g. a pre-recorded announcement or an automatically generated announcement) over a loudspeaker system, or sound an alarm. In some embodiments, the access control system may include in a message or announcement identification information of the individual associated with the credential device 110 and/or the beacon device 108, e.g. to assist security guards, employees, or other persons to locate the individual associated with the credential device 110 and/or the beacon device 108.

When the visitor's visit to the secure facility is over, the visitor may return his or her beacon device 108 and credential device 110 to the access control system administrator (or another administrative individual, such as a receptionist or security guard, either one of which may in some embodiments also be an access control system administrator). The administrator may then de-associate the credential device 110 from the beacon device 108 (step 616). For example, the administrator may input a command (e.g. via the access server 120 or the computing device 124) that causes the access control system 100 (or, more particularly, one or more readers 112, and/or the access server 120) to remove from any database, spreadsheet, or memory any association between the beacon ID 424 of the beacon device 108 and the tracker ID 428 of the credential device 110. As another example, the administrator may input a command (e.g. via the access server 120 or the computing device 124) that causes a signal to be sent to the beacon device 108 (e.g. via a reader 112) that commands the beacon device 108 to delete the tracker ID 428 of the credential device 110 from the memory 404 of the beacon device 108.

The system administrator may also de-associate the visitor from the credential device (step 620). This may be accomplished by, for example, deleting (or causing to be deleted) the visitor identification information from the spreadsheet or database that associates the visitor identification information with the credential device 110.

In some embodiments, both steps 616 and 620 may be accomplished automatically, whether at a predetermined time (e.g. at the close of business, at a check-out time, or at any other predetermined time) or when one or both of the beacon device 108 and the credential device 110 communicates with a designated reader 112, such as a reader 112 at a front desk of the secure facility or readily accessible to the system administrator.

Data and/or applications such as spreadsheets, databases, location determinations and inferences, and the like may be stored in one or both of an access data memory 116 and an access data memory 118. Such data and/or applications may also be stored in a memory of the access server 120.

Figure 7:
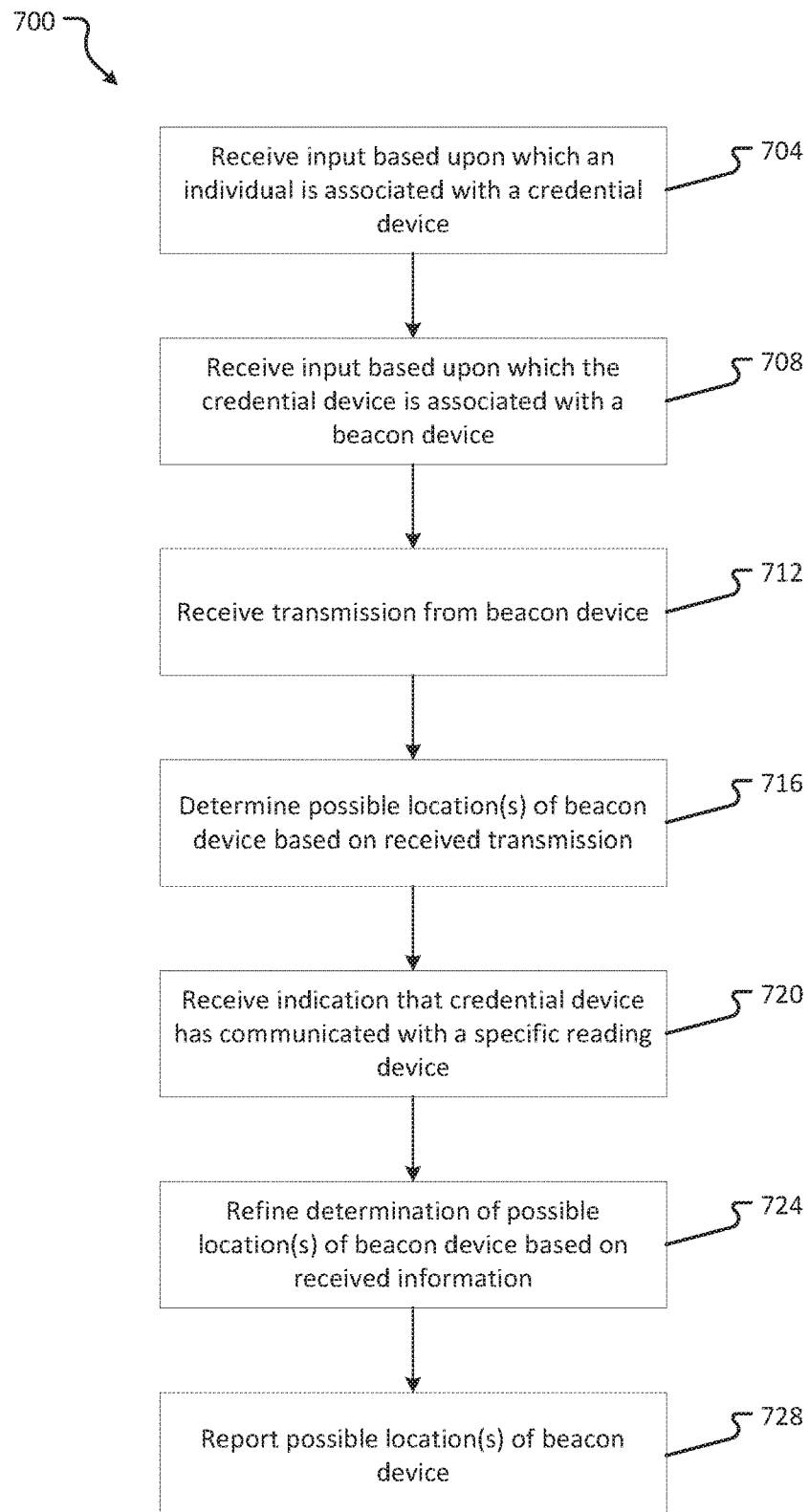
FIG. 7 is a flowchart depicting another method according to at least one embodiment of the present disclosure.

Referring now to FIG. 7, a method 700 according to at least one embodiment of the present disclosure comprises receiving an input based upon which an individual is associated with a credential device (step 704). The input is received on a computing device, which may be, for example, an access server 120 or a computing device 124. The input comprises identifying information about an individual, which may include, for example, the individual's name, age, birthday, height, weight, skin color, hair color, eye color, social security number, other identification number, driver's license number, passport number, telephone number, email address, residential address, work address, and/or mailing address. The identifying information may be contained in a signal generated based upon the scanning/reading of a driver's license or a passport (or of a barcode or magnetic strip on a driver's license or a passport), which signal may contain identifying information about the holder of the driver's license or passport. The identifying information may also be provided by an access control system administrator or other user of a user interface connected to or forming part of an access server 120 and/or a computing device 124. For example, a system administrator may type identification information for the individual in question into a spreadsheet or database using a user interface of the access server 120 or computing device 124.

Upon receipt of the input, the computing device 124 or access server 120 associates the individual (or, more specifically, one or more pieces of identifying information about the individual) with a particular credential device 110. The association may be made, for example, in a spreadsheet or database, and may be stored in a memory of the computing device 124, or of the access server 120, or of one or more readers 112, and/or in an access data memory 118 or 116.

In some embodiments of the present disclosure, the input may be received on a smart phone or other mobile device of the individual himself or herself. For example, if the smart phone or other mobile device is configured to communicate via NFC, to scan barcodes, and/or to read magnetic stripes, then the individual may use his or her smart phone or other mobile device to obtain a tracker ID 428 or other identifying information from a credential device 110. The smartphone may utilize a mobile app installed thereon to cause the smartphone to obtain the information from the credential device 110.

The method 700 may also comprise receiving an input based upon which the credential device 110 is associated with a beacon device 108 (step 708). The input may be a signal transmitted by a beacon device 108 and received by a reader 112 or other communication interface associated with the computing device 124 and/or access server 120 (e.g. a reader 112 that is readily accessible to a system administrator). The input may also comprise manual entry of a beacon ID 424 or other identifying information of the beacon device 108 into the computing device 124 or access server 120. In some embodiments, the input may comprise a tracker ID 428 or other identifying information associated with the credential device 110.

Upon receipt of the input, the computing device 124 or access server 120 associates the credential device 110 (or, more specifically, one or more pieces of identifying information about the credential device 110) with a particular beacon device 108. The association may be made, for example, in a spreadsheet or database, and may be stored in a memory of the computing device 124, or of the access server 120, or of one or more readers 112, and/or in an access data memory 118 or 116. The association may cause the beacon device 108 to begin periodically transmitting or broadcasting a signal, which may include, for example, a beacon ID 424 and/or a tracker ID 428.

In embodiments where a smart phone or other mobile device of the individual receives the input based upon which the individual is associated with a credential device 110 in step 704, the smart phone or other mobile device may also receive or provide the input based upon which the credential device 110 is associated with a beacon device 108 in step 708. For example, the smart phone or other mobile device may communicate directly with the beacon device 108 (e.g. using a BLE interface) to obtain a beacon ID 424 thereof, and may transmit the beacon ID 424 (together with, in some embodiments, a tracker ID 428 or other information about the credential device 110) to the access server 120 via the communication network 128. Alternatively, the smart phone or other mobile device may provide the tracker ID 428 of the credential device 110 to the beacon device 108, which may adopt the tracker ID 428 as the beacon ID 424, and thus be associated with the credential device 110 by virtue of sharing the same identifier.

In addition to creating an electronic association between the credential device 110 and the beacon device 108, a physical association between the two devices may also be made. For example, in embodiments where the beacon device 108 is in the form of a lanyard or lanyard attachment, a badge holder, or a retractable badge reel, the credential device 110 may be attached to or in the vicinity of the beacon device 108 to facilitate the carrying of the beacon device 108 and the credential device 110 by the individual associated with the credential device 110.

The method 700 may further comprise receiving a transmission from the beacon device (step 712). The transmission may be a signal transmitted or broadcasted by the beacon device 108 on a periodic basis, and may comprise a beacon ID 424, a tracker ID 428, or other information allowing the beacon device 108 to be distinguished from other beacon devices. The transmission may be received by one or more readers 112, and may be received while the beacon device 108 is too far from the one or more readers 112 to allow the one or more readers 112 to communicate with or obtain information from the credential device 110. In some embodiments, the transmission may not include a beacon ID 424 or a tracker ID 428, but may instead allow or cause one or more readers 112 (e.g. the reader(s) 112 that receive the transmission) to establish a connection with the beacon device 108 and read one or both of the beacon ID 424 and the tracker ID 428 from the memory 404 of the beacon device 108.

Based on the received transmission, one or more of the access server 120, the computing device 124, and the one or more readers 112 may determine a possible location or a set of possible locations of the beacon device 108 (step 716). The determination may be made using known position determination techniques, including triangulation, and may utilize one or more techniques such as RSSI, echo detection, and phase detection to calculate or estimate a distance between a given reader 112 and the beacon device 108, an angle between a given reader 112 and the beacon device 108, and/or a position of the beacon device 108 relative to the one or more readers 112 or relative to an electronic or digital map of the facility in which the access control system 100 is installed. The determination may also utilize the known position (including distances and angles between the known positions) of a plurality of readers 112, including the one or more readers 112.

The method 700 may further comprise receiving an indication that the credential device 110 has communicated with (or been scanned or read by) a specific reader 112 (step 720). Because a reader 112 can obtain information from a credential device 110 only when the credential device 110 is physically proximate to the reader 112 (e.g. within NFC communication range, or close enough to be scanned by a barcode scanner or to be swiped through a magnetic stripe reader), an indication that the reader 112 has obtained information directly from a credential device 110 allows the position of the credential device 110 to be determined with a high degree of certainty.

Consequently, the indication that a reader 112 has obtained information directly from a credential device 110 may be used to refine a previous (or a subsequent) determination of possible locations of the beacon device 108 that were or are based on a transmission received from the beacon device 108 (step 724). For example, if a previous transmission from the beacon device 108 resulted in a set of determined possible positions (e.g. because the transmission was only received by one reader 112, and only the distance from the beacon device 108 to the reader 112 was able to be determined based on the transmission), then the determined position of the credential device 110 from the step 720 may be used to eliminate one or more of the determined possible positions (e.g. those possible positions that are far enough away from the determined position of the credential device 110 that it would have been physically impossible, difficult, or unlikely for the holder of the beacon device 108 and credential device 110 to move from the possible positions to the determined position of the credential device within the amount of time that passed between the determining of the set of possible positions and the receipt by the reader 112 of information directly from the credential device 110.

Additionally, the receipt over time by different readers 112 of transmissions from the beacon device 108 may be used to determine a direction of movement of the holder of the beacon device 108, which direction of movement may also be used to eliminate potential position determinations when there is insufficient information to determine a single position of the beacon device 108. For example, if over a given period of time a series of readers 112 sequentially receive one or more transmissions from a beacon device 108, and each of the series of readers 112 is positioned to the west of the preceding reader 112, then the access server 120 (or the computing device 124, or one or more readers 112) can infer that the holder of the beacon device 108 is moving westward, and use that inference to eliminate potential position determinations that would require the holder of the beacon device 108 to be moving eastward.

As position determinations for a beacon device 108 are made and refined, those position determinations (or a summary thereof, or other information based thereon) may be reported by the access server 120, the computing device 124, and/or one or more readers 112 (step 728). The reporting may be from one component of the access control system to another (e.g. from a reader 112 to the access server 120, or from the access server 120 to the computing device 124), or the reporting may be from one component of the access control system 100 to outside of the access control system 100 (e.g. from the access server 120 to a communication device belonging to an access control system administrator or to a security officer, whether via email, text message, or another electronic communication format). The reporting may be used simply to verify that an individual is within a security facility, or to verify that the individual is or is not within a particular area of a secure facility, or to ensure that the individual is within an expected area of a secure facility (e.g. the area in which the individual works, or the area that the individual was authorized to visit). The reporting may be used to trigger an alarm (e.g. if the individual is in an unauthorized location within the secure facility, or if the individual is no longer within the secure facility), or to request the assistance of a security officer, or for emergency response purposes. These examples, however, are not limiting, and persons of ordinary skill in the art will recognize other potential uses of the reporting based upon the foregoing disclosure.

Figure 8:
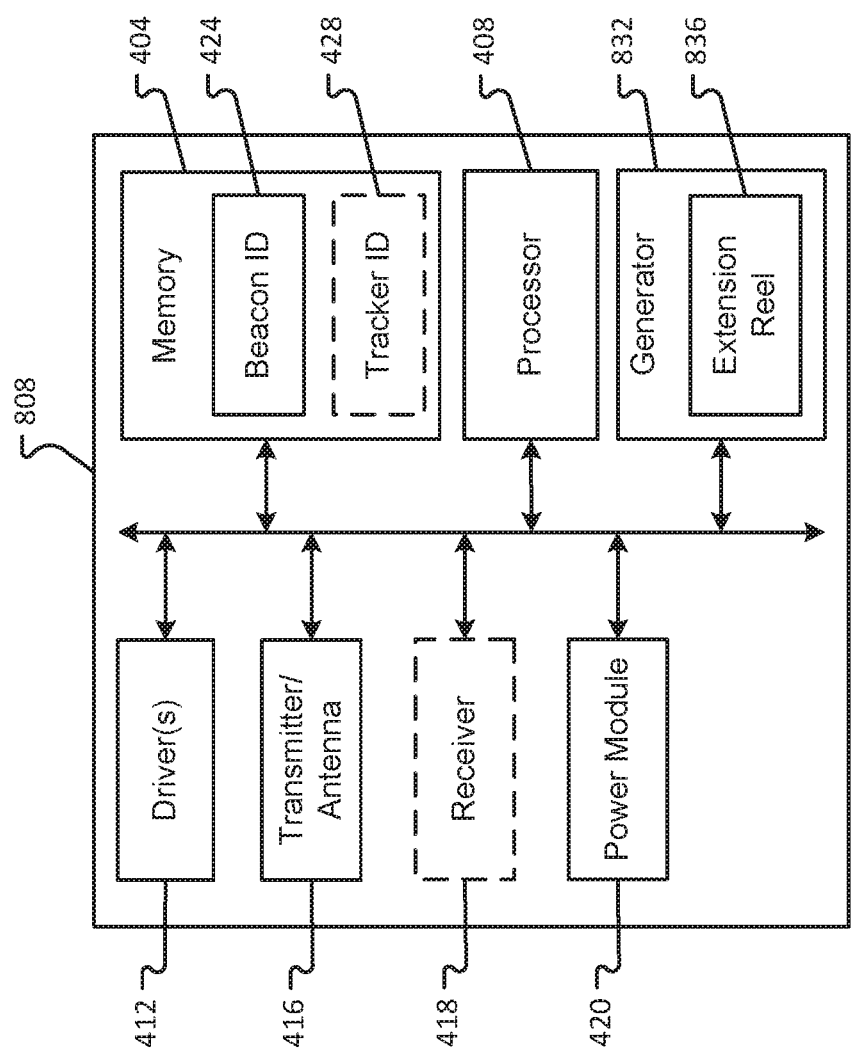
FIG. 8 is a block diagram depicting another beacon device according to at least one embodiment of the present disclosure.

With reference now to FIG. 8, a beacon device 808 according to some embodiments of the present disclosure may comprise the same or substantially similar components as the beacon device 108 depicted in FIG. 4. The beacon device 808 may also comprise, however, a generator 832 operatively connected to a retractable extension reel 836. In this embodiment, the beacon device 808 may be in the form of a retractable badge reel, and the credential device 110 may be attached to the extension reel 836. When the holder of the beacon device 808 and credential device 110 pulls the credential device 110 to swipe the credential device 110 through a magnetic strip reader of a reader 112, or to allow a reader 112 to scan a barcode thereon, or to tap the credential device 110 on the reader 112 to initiate NFC or other wireless communications between the two devices, or for any other purpose, the extension of the extension reel 836 activates the generator 832, which generates an electrical current that may be used, for example, to recharge the power module 420 (e.g. where the power module 420 is a battery or other energy storage device). Similarly, the generator may also be activated upon retraction of the extension reel 836.

While embodiments of the present disclosure have been primarily described as including a beacon device 108 that communicates with one or more readers 112 using a beyond-near-field-range communication protocol (e.g. BLE, Bluetooth, and/or WiFi) and a credential device 110 that communications with the one or more readers 112 using a communication protocol with a shorter communication range than the beacon device 108, it should be appreciated that the present disclosure encompasses embodiments in which the beacon device 108 and the credential device 110 utilize the same communication protocol, as well as embodiments in which the credential device 110 utilizes a communication protocol with a greater range than a communication protocol used by the beacon device 108. Indeed, the beacon device 108 and the credential device 110 may have the same communication capabilities, or they may have different communication capabilities (whether in terms of, by way of example but not limitation, communication protocol, communication range, or transmission signal strength). In embodiments where the beacon device 108 and the credential device 110 have different communication capabilities, the communication capabilities of either device may be superior.

In some embodiments of the present disclosure, and particularly in embodiments implemented in connection with high security facilities, a pseudonymous ID and even a trusted pseudonymous ID may be used to ensure that transmissions or broadcasts from beacon devices 108 are not merely copies of previous transmissions or broadcasts intended to hide the actual location of a beacon device 108 or its associated credential device 110 or user 102. For example, a tracker ID 428 and/or a beacon ID 424 may be pseudonymized by replacing the actual identifier with an artificial identifier. This allows the true identity of the beacon device 108 and the credential device 110 to be masked, at least to some extent, from anyone or anything that does not have the formula or algorithm used to pseudonymize the identifiers. In some embodiments, the pseudonymous identifier may remain the same for each transmission (e.g. as long as the beacon device 108 is associated with the same credential device 110, and as long as the credential device 110 is associated with the same user 102), while in other embodiments, the pseudonymous identifier may change periodically or with each transmission.

Also in some embodiments, the beacon device 108 may comprise the ability to generate a pseudo-random sequence of numbers that can be appended to the beacon ID 424, such as a URL, email address, phone number, etc. The validation of this pseudo-random sequence of numbers may be done by a validation engine 336 located in one or more of the readers 112 and the access server 120. The validation engine 336 may track the sequence for each beacon device 108 and indicate whether the beacon device 108 has generated the next number in the sequence, indicating a reader 112 receiving the beacon ID 424 with the appended pseudo-random sequence of numbers has, in fact, interacted with the beacon device 108 (rather than with a device that is transmitting a copy of a previous transmission from the beacon device 108).

Additionally, one or more components of the access control system 100 (e.g. the access server 120, the computing device 124, and/or one or more readers 112) may track the number of unique transmissions (e.g. not counting repeat instances of the same transmission being received by multiple readers 112) received from a given beacon device 108. Additionally, a beacon device 108's periodic transmissions or broadcasts may comprise a counter, which may be compared against the number of unique transmissions being tracked by a component of the access control system 100 to verify that a received transmission is not merely a copy or replay of a previous transmission.

In some embodiments of the present disclosure, the beacon device 108 uses the Apple iBeacon protocol. Whether or not the beacon device 108 uses the Apple iBeacon protocol, in some embodiments the beacon device 108 may be configured to periodically or occasionally change, scramble, encode, or otherwise modify its beacon ID 424, such that a reader 112, an access server 120, a computing device 124, or other components of the access control system 100 do not recognize the modified beacon ID 424 and cannot associate the modified beacon ID 424 with a tracker ID 428 corresponding to a credential device 110 and/or to a user 102. Thus, in some embodiments, a user 102 may have or be provided with a plurality of beacon devices 108 (which may be physically separate, or may be combined into the same physical device, and, in the latter instance, may share one or more components). Each beacon device 108 provided to the user 102 may then be associated with the same credential device 110, and one or more readers 112 may receive periodic transmissions from each beacon device 108.

The provision of multiple beacon devices 108 to a user 102 allows for the effective use of beacon devices 108 even when the beacon devices 108 are configured to periodically or occasionally modify their respective beacon IDs 424. For example, a user 102 may be provided with four beacon devices 108 and one credential device 124. If a first beacon device 108 of the four beacon devices 108 modifies its beacon ID 424, then the access server 120 (or the computing device 124) will still be able to determine a location of the first beacon device 108 with the modified beacon ID 424 based on receipt by one or more readers 112 of one or more transmissions from the first beacon device 108. However, the access server 120 will not be able to determine, based solely on the transmissions of the first beacon device 108, that the first beacon device 108 is one of the four beacon devices 108 associated with the credential device 110. Even so, if the access server 120 determines that the location of the first beacon device 108 is the same as (or substantially the same as) the location of the other three beacon devices 108, then the access server 120 can infer that the first beacon device 108 has modified its beacon ID 424, and can associate the modified beacon ID 424 with the credential device 110. In some embodiments, the access server 120 may also verify that the first beacon device 108 has modified its beacon ID 424 by determining that it has not received any transmissions associated with the previous beacon ID 424 of the first beacon device 108 within a predetermined period of time.

In this manner, each time one of the four beacon devices 108 modifies its beacon ID 424, the access server 120 can identify the modified beacon ID 424, determine that it belongs to one of the four beacon devices 108, and associated the modified beacon ID 424 with the credential device 110. The use of multiple beacon devices 108 enables the access control system 100 to continue to track the credential device 110 notwithstanding the periodic or occasional modification of the beacon ID 424 of a beacon device 108 associated with the credential device 110.

The use of multiple beacon devices 108 each transmitting a separate signal that may be received by one or more readers 112 may also be used for purposes of authentication and/or access control. For example, if one or more of a plurality of beacon devices 108 associated with a credential device 110 stops transmitting, or if the location of such a beacon device 108 can no longer be determined (regardless of the reason), then an access control system 100 may be configured to impose greater authentication or authorization requirements on the holder of the credential device 110 associated with the plurality of beacon devices 108. Such authentication or authorization requirements may include, for example, requiring a user 102 to provide a pin or submit to a biometric scan (in addition to allowing a reader 112 to obtain credentials from the credential device 110 of the user 102) before access to a protected area will be granted.

The exemplary systems and methods of this disclosure have been described in relation to mobile devices, systems, and methods in an access control system. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should, however, be appreciated that the present disclosure may be practiced in a variety of ways beyond the specific detail set forth herein. Moreover, it should be appreciated that the methods disclosed herein may be executed via a wearable device, a mobile device, a reader, a computing device, and/or an access server of an access control system, etc.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet other embodiments, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In other embodiments, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

Any of the steps, functions, and operations discussed herein can be performed continuously and automatically.

What is claimed is:

1. An access control system, comprising:
    a credential device configured to wirelessly communicate with one or more readers using a first communication protocol;
    a beacon device configured to wirelessly communicate with the one or more readers using a second communication protocol that is different from the first communication protocol; and
    an access server configured to receive communications from the one or more readers, associate the credential device with the beacon device in a memory, and determine, based on the received communications from the one or more readers, a location of the beacon device and the credential device.

2. The system of claim 1, wherein the access server comprises a communication interface that enables the access server to receive the communications from the one or more readers.

3. The system of claim 1, wherein the second communication protocol comprises at least one of Bluetooth, Bluetooth Low Energy (BLE), and WiFi.

4. The system of claim 3, wherein the first communication protocol utilizes inductive communications.

5. The system of claim 4, wherein the one or more readers receive a communication from the beacon device at a first time and wherein the credential device communicates with the one or more readers at a second time different from the first time.

6. The system of claim 5, wherein the first time precedes the second time.

7. The system of claim 1, wherein a communication range of the second communication protocol is greater than a communication range of the first communication protocol.

8. The system of claim 1, wherein the beacon device is chargeable by motion of a retractable member.

9. The system of claim 1, wherein the one or more readers receive a beacon identifier from the beacon device via the second communication protocol.

10. The system of claim 1, wherein two or more readers receive a communication from the beacon device and wherein a position of the beacon device is determined, at least in part, based on triangulation among the beacon device and a first and second of the two or more readers that receive the communication from the beacon device.

11. The system of claim 1, wherein the access server comprises an asset tracking module to determine a location of the beacon device and the credential device.

12. The system of claim 1, wherein the access server is further configured to change an access authorization of the credential device based upon the location of the beacon device and the credential device.

13. The system of claim 1, wherein the access server comprises a validation engine configured to verify that information received by the one or more readers and included in the communications from the one or more readers originated from the beacon device, based on pseudorandom sequences of data included in the information.

14. An access control system, comprising:
a credential device configured to communicate with a first reader using a first communication protocol;
a beacon device configured to wirelessly communicate with a second reader using a second communication protocol, the second communication protocol being different from the first communication protocol; and
an access server configured to receive communications from the first and second readers, and determine, based on the received communications from the first and second readers, a location of the beacon device and the credential device.

15. The access control system of claim 14, wherein the first communication protocol utilizes at least one of Radio-frequency identification (RFID) and Near-field communication (NFC).

16. The access control system of claim 15, wherein the second communication protocol utilizes at least one of Bluetooth, Bluetooth Low Energy (BLE), and WiFi.

17. The access control system of claim 14, wherein the second communication protocol utilizes the iBeacon protocol.

18. The access control system of claim 14, wherein the access server is configured to associate the credential device with the beacon device.

19. The access control system of claim 14, wherein the beacon device broadcasts an identifier at periodic intervals.

20. The access control system of claim 14, wherein the beacon device broadcasts a pseudonymous identifier.

21. The access control system of claim 20, wherein the pseudonymous identifier changes periodically.

22. The access control system of claim 14, wherein authentication is required between the credential device and the first reader before further communications between the credential device and the first reader are enabled.

23. An access control system, comprising:
a credential device configured to communicate with a first reader using a first communication protocol;
a beacon device configured to broadcast an identifier to a second reader using a second communication protocol, the second communication protocol being different from the first communication protocol; and
an access server configured to receive communications from the first and second readers, and determine, based on the received communications from the first and second readers, a location of the beacon device and the credential device.

24. The access control system of claim 23, wherein the access server is configured to associate the credential device with the beacon device.

25. The access control system of claim 23, wherein the beacon device broadcasts the identifier at periodic intervals.

26. The access control system of claim 23, wherein the identifier is a pseudonymous identifier.

27. The access control system of claim 26, wherein the pseudonymous identifier changes periodically.

28. The access control system of claim 23, wherein authentication is required between the credential device and the first reader before further communications between the credential device and the first reader are enabled.

* * * * *